US012518109B1

(12) United States Patent
Deutsch et al.

(10) Patent No.: US 12,518,109 B1
(45) Date of Patent: Jan. 6, 2026

(54) LANGUAGE MODEL AUTOMATIONS

(71) Applicant: OpenAI OpCo, LLC., San Francisco, CA (US)

(72) Inventors: Noah Deutsch, San Francisco, CA (US); Thomas Dimson, San Francisco, CA (US); Grant Jenks, Santa Clara, CA (US); Constantin Koumouzelis, Mountain View, CA (US); Karina Nguyen, San Francisco, CA (US); Andrew Schmidt, San Francisco, CA (US); Key Shin, Menlo Park, CA (US); Madeline Simens, San Francisco, CA (US); Vivek Verma, San Francisco, CA (US); Kshitij Wadhwa, San Francisco, CA (US)

(73) Assignee: OpenAi OpCo, LLC., San Francisco, CA (US)

( * ) Notice: Subject to any disclaimer, the term of this patent is extended or adjusted under 35 U.S.C. 154(b) by 0 days.

(21) Appl. No.: 19/043,113

(22) Filed: Jan. 31, 2025

Related U.S. Application Data

(60) Provisional application No. 63/745,280, filed on Jan. 14, 2025.

(51) Int. Cl.
*G06F 17/00* (2019.01)
*G06F 40/35* (2020.01)
*G06F 40/40* (2020.01)

(52) U.S. Cl.
CPC .............. *G06F 40/35* (2020.01); *G06F 40/40* (2020.01)

(58) Field of Classification Search
None
See application file for complete search history.

(56) References Cited

U.S. PATENT DOCUMENTS

| 11,379,601 B2 | 7/2022 | Agarwal |
| 11,386,186 B2 | 7/2022 | Siddiquee et al. |
| 11,392,707 B2 | 7/2022 | Watson et al. |
| 11,399,028 B1 | 7/2022 | Krishnamoorthy et al. |

(Continued)

OTHER PUBLICATIONS

Drosos et al "Dynamic Prompt Middleware: Contextual Prompt Refinement Controls for Comprehension Tasks," pp. 1-36 (Year: 2024).

(Continued)

*Primary Examiner* — Satwant K Singh
(74) *Attorney, Agent, or Firm* — Polsinelli PC

(57) ABSTRACT

The present technology pertains to a system for generating automations based on a request/prompt from a user to a language model. The language model receives a prompt in a conversation thread with a user. When the prompt includes a request for a delayed action (i.e., an automation), the request is forwarded to an automations engine, which determines the delayed action from an action component of the request and a time at which to perform the delayed action from a temporal component of the request. A scheduling instruction based on the determined time is sent to a scheduler, which signals when the time occurs, triggering the automations engine to perform the delayed action, for example, by acting as the user's delegate and sending a delayed prompt to the language model to elicit a response and amending part or all of the resulting conversation to the conversation thread with the user.

20 Claims, 22 Drawing Sheets

(56) References Cited

U.S. PATENT DOCUMENTS

| | | | |
|---|---|---|---|
| 11,528,274 | B1 | 12/2022 | Krishnamoorthy et al. |
| 11,544,800 | B1* | 1/2023 | Bell .................. G06F 40/30 |
| 11,561,772 | B2 | 1/2023 | Levitt et al. |
| 11,675,491 | B2 | 6/2023 | Meyer et al. |
| 11,696,060 | B2 | 7/2023 | Gong et al. |
| 11,741,971 | B1 | 8/2023 | You et al. |
| 11,765,207 | B1 | 9/2023 | McCarthy |
| 11,775,867 | B1 | 10/2023 | Jamei |
| 11,782,965 | B1 | 10/2023 | Dargude et al. |
| 11,783,815 | B2 | 10/2023 | Greborio et al. |
| 11,790,902 | B2* | 10/2023 | Whalin .................. G10L 15/22 |
| | | | 704/251 |
| 11,829,952 | B1 | 11/2023 | Hoehnen et al. |
| 11,831,644 | B1 | 11/2023 | Thakore |
| 11,838,176 | B1 | 12/2023 | Vanjare et al. |
| 11,893,992 | B2 | 2/2024 | Piernot et al. |
| 11,900,341 | B1 | 2/2024 | Chiu et al. |
| 11,909,858 | B1 | 2/2024 | Hron et al. |
| 11,973,784 | B1 | 4/2024 | Parikh et al. |
| 11,989,636 | B1 | 5/2024 | Leeds et al. |
| 12,020,045 | B1 | 6/2024 | Wilson et al. |
| 12,026,197 | B2 | 7/2024 | Graham et al. |
| 12,033,006 | B1 | 7/2024 | Nair et al. |
| 12,058,160 | B1 | 8/2024 | Parikh et al. |
| 12,074,895 | B1 | 8/2024 | Shen et al. |
| 12,080,287 | B2 | 9/2024 | Schramm et al. |
| 12,101,331 | B1 | 9/2024 | Katta |
| 12,120,237 | B1 | 10/2024 | Paris, III |
| 12,141,326 | B1 | 11/2024 | Barouch et al. |
| 12,142,298 | B1 | 11/2024 | Kottur et al. |
| 12,149,524 | B1 | 11/2024 | Fish et al. |
| 12,155,700 | B1 | 11/2024 | Mccord et al. |
| 12,159,155 | B1 | 12/2024 | Alexander et al. |
| 12,169,802 | B1 | 12/2024 | Eldan et al. |
| 12,176,007 | B1 | 12/2024 | Rivers |
| 12,177,176 | B1 | 12/2024 | Mehta et al. |
| 12,190,416 | B1 | 1/2025 | Papancea et al. |
| 12,197,817 | B2 | 1/2025 | Piersol et al. |
| 12,218,950 | B1 | 2/2025 | Wang et al. |
| 12,219,193 | B1 | 2/2025 | Perelli-Minetti et al. |
| 12,223,282 | B2 | 2/2025 | Nell et al. |
| 12,223,458 | B2 | 2/2025 | Bronicki et al. |
| 12,254,887 | B2 | 3/2025 | Kim et al. |
| 12,259,921 | B1 | 3/2025 | Guriel et al. |
| 12,260,260 | B1 | 3/2025 | Gorman et al. |
| 12,271,688 | B1 | 4/2025 | Moreno et al. |
| 12,284,172 | B1 | 4/2025 | Bell et al. |
| 12,284,189 | B1 | 4/2025 | Schwartz et al. |
| 12,309,180 | B1 | 5/2025 | Shevrin et al. |
| 12,309,185 | B1 | 5/2025 | Skarphedinsson et al. |
| 12,323,449 | B1 | 6/2025 | Graves et al. |
| 12,368,745 | B1 | 7/2025 | Guo et al. |
| 2020/0228880 | A1 | 7/2020 | Iyer et al. |
| 2022/0191024 | A1 | 6/2022 | Liu et al. |
| 2022/0207163 | A1 | 6/2022 | Gentleman et al. |
| 2022/0210171 | A1 | 6/2022 | Grossman et al. |
| 2022/0224685 | A1 | 7/2022 | Dhindsa et al. |
| 2022/0266451 | A1 | 8/2022 | Cristache |
| 2022/0274251 | A1 | 9/2022 | Leon et al. |
| 2022/0309041 | A1 | 9/2022 | Whitechapel et al. |
| 2022/0309412 | A1 | 9/2022 | Tomaselli et al. |
| 2022/0360585 | A1 | 11/2022 | Ramsperger et al. |
| 2022/0405193 | A1 | 12/2022 | Ashok et al. |
| 2023/0007005 | A1 | 1/2023 | Koneru |
| 2023/0028912 | A1 | 1/2023 | Steingrimsson |
| 2023/0030124 | A1 | 2/2023 | Hearty et al. |
| 2023/0043702 | A1 | 2/2023 | Sells et al. |
| 2023/0062052 | A1 | 3/2023 | Sheshadri et al. |
| 2023/0078448 | A1 | 3/2023 | Cella et al. |
| 2023/0083724 | A1 | 3/2023 | Cella et al. |
| 2023/0098602 | A1 | 3/2023 | Cella et al. |
| 2023/0102048 | A1 | 3/2023 | Cella et al. |
| 2023/0123322 | A1 | 4/2023 | Cella et al. |
| 2023/0135179 | A1 | 5/2023 | Mielke et al. |
| 2023/0152598 | A1 | 5/2023 | Brebner et al. |
| 2023/0153447 | A1 | 5/2023 | Kapadia |
| 2023/0172510 | A1 | 6/2023 | Alford |
| 2023/0206329 | A1 | 6/2023 | Cella et al. |
| 2023/0206708 | A1 | 6/2023 | Carter |
| 2023/0222454 | A1 | 7/2023 | Cella et al. |
| 2023/0222531 | A1 | 7/2023 | Cella et al. |
| 2023/0238119 | A1* | 7/2023 | Bleeker .............. G06Q 10/1095 |
| | | | 705/2 |
| 2023/0273958 | A1 | 8/2023 | Laliberte et al. |
| 2023/0273959 | A1 | 8/2023 | Laliberte et al. |
| 2023/0281249 | A1 | 9/2023 | Laliberte |
| 2023/0281583 | A1 | 9/2023 | Jakobsson et al. |
| 2023/0283628 | A1 | 9/2023 | Johnston |
| 2023/0297406 | A1 | 9/2023 | Rogers et al. |
| 2023/0297696 | A1 | 9/2023 | Rogers et al. |
| 2023/0297860 | A1 | 9/2023 | Hosseini et al. |
| 2023/0319044 | A1 | 10/2023 | Warnicke et al. |
| 2023/0344896 | A1 | 10/2023 | Keren et al. |
| 2023/0359959 | A1 | 11/2023 | Harding et al. |
| 2023/0368284 | A1 | 11/2023 | Sheikh et al. |
| 2023/0368878 | A1 | 11/2023 | Molenda |
| 2023/0396620 | A1 | 12/2023 | Gandhi |
| 2023/0403357 | A1 | 12/2023 | Ezell |
| 2023/0409615 | A1 | 12/2023 | Khemka et al. |
| 2023/0410223 | A1 | 12/2023 | Dobson et al. |
| 2023/0410801 | A1 | 12/2023 | Mishra |
| 2023/0421562 | A1 | 12/2023 | Hakim et al. |
| 2024/0004690 | A1 | 1/2024 | Bari et al. |
| 2024/0031367 | A1 | 1/2024 | Pringle |
| 2024/0037646 | A1 | 2/2024 | Sheikh et al. |
| 2024/0039916 | A1 | 2/2024 | McPeak et al. |
| 2024/0045935 | A1 | 2/2024 | Schenkelman et al. |
| 2024/0046318 | A1 | 2/2024 | Muriqi |
| 2024/0070257 | A1 | 2/2024 | Paslaru et al. |
| 2024/0071371 | A1 | 2/2024 | Hamlin et al. |
| 2024/0071385 | A1* | 2/2024 | Whalin .............. G10L 15/1822 |
| 2024/0073219 | A1 | 2/2024 | Maizels et al. |
| 2024/0095001 | A1 | 3/2024 | Patel |
| 2024/0095320 | A1 | 3/2024 | Balasubramanya et al. |
| 2024/0105171 | A1 | 3/2024 | Chaganti et al. |
| 2024/0119932 | A1 | 4/2024 | Khorshid et al. |
| 2024/0144141 | A1 | 5/2024 | Cella et al. |
| 2024/0146734 | A1 | 5/2024 | Southgate et al. |
| 2024/0147431 | A1 | 5/2024 | Li et al. |
| 2024/0154967 | A1 | 5/2024 | McGuinness et al. |
| 2024/0154968 | A1 | 5/2024 | Kwon et al. |
| 2024/0161742 | A1 | 5/2024 | Sherman Lu et al. |
| 2024/0179181 | A1 | 5/2024 | Torlak et al. |
| 2024/0179188 | A1 | 5/2024 | Torlak et al. |
| 2024/0187414 | A1 | 6/2024 | Osipov et al. |
| 2024/0202464 | A1 | 6/2024 | Poirier et al. |
| 2024/0205231 | A1 | 6/2024 | Bardhan et al. |
| 2024/0205301 | A1 | 6/2024 | Presley et al. |
| 2024/0205332 | A1* | 6/2024 | Tzur .................. H04M 3/5166 |
| 2024/0212804 | A1 | 6/2024 | Turock et al. |
| 2024/0236101 | A1 | 7/2024 | Pan et al. |
| 2024/0252048 | A1 | 8/2024 | Tran |
| 2024/0257592 | A1 | 8/2024 | Carter |
| 2024/0265473 | A1 | 8/2024 | Farzanfar |
| 2024/0266010 | A1 | 8/2024 | Adhikari et al. |
| 2024/0281600 | A1 | 8/2024 | Brown et al. |
| 2024/0305669 | A1 | 9/2024 | Hyder et al. |
| 2024/0310851 | A1 | 9/2024 | Ebrahimi Afrouzi et al. |
| 2024/0311118 | A1 | 9/2024 | Malvankar et al. |
| 2024/0313973 | A1 | 9/2024 | Kravitz et al. |
| 2024/0320310 | A1 | 9/2024 | Callegari et al. |
| 2024/0348663 | A1 | 10/2024 | Crabtree et al. |
| 2024/0354434 | A1 | 10/2024 | Buckley et al. |
| 2024/0362036 | A1 | 10/2024 | Jacob et al. |
| 2024/0362423 | A1 | 10/2024 | Agrawal et al. |
| 2024/0362730 | A1 | 10/2024 | Nowacky et al. |
| 2024/0370898 | A1 | 11/2024 | Vakil et al. |
| 2024/0386015 | A1 | 11/2024 | Crabtree et al. |
| 2024/0396896 | A1 | 11/2024 | Coulter et al. |
| 2024/0403078 | A1 | 12/2024 | Wilson et al. |
| 2024/0403396 | A1 | 12/2024 | Hawes et al. |
| 2024/0403453 | A1 | 12/2024 | Zangri et al. |
| 2024/0404687 | A1 | 12/2024 | Bell et al. |
| 2024/0406166 | A1 | 12/2024 | Bell et al. |

(56) References Cited

U.S. PATENT DOCUMENTS

| | | |
|---|---|---|
| 2024/0411752 A1 | 12/2024 | Prabhakar et al. |
| 2024/0411906 A1 | 12/2024 | White |
| 2024/0412720 A1 | 12/2024 | Vasylyev |
| 2024/0430310 A1 | 12/2024 | Finster |
| 2025/0013449 A1 | 1/2025 | Habiba et al. |
| 2025/0016192 A1 | 1/2025 | Montgomery et al. |
| 2025/0022330 A1 | 1/2025 | Carter |
| 2025/0023875 A1 | 1/2025 | Charlson |
| 2025/0030438 A1 | 1/2025 | Cooper et al. |
| 2025/0036773 A1 | 1/2025 | Chihaia et al. |
| 2025/0036853 A1 | 1/2025 | Shtekel et al. |
| 2025/0037051 A1 | 1/2025 | Mohapatra |
| 2025/0037144 A1 | 1/2025 | Srivastava et al. |
| 2025/0037391 A1 | 1/2025 | Nguyen et al. |
| 2025/0039062 A1 | 1/2025 | Bennett et al. |
| 2025/0044868 A1 | 2/2025 | Garcia Delgado et al. |
| 2025/0045256 A1 | 2/2025 | Gottlob et al. |
| 2025/0045304 A1 | 2/2025 | Quatro |
| 2025/0045595 A1 | 2/2025 | Brook et al. |
| 2025/0053383 A1 | 2/2025 | Woodward, Jr. et al. |
| 2025/0053399 A1 | 2/2025 | Woodward, Jr. et al. |
| 2025/0053735 A1 | 2/2025 | Shevchenko et al. |
| 2025/0053749 A1 | 2/2025 | Phu et al. |
| 2025/0053794 A1 | 2/2025 | Birru et al. |
| 2025/0054008 A1 | 2/2025 | Cella et al. |
| 2025/0054643 A1 | 2/2025 | Ronen et al. |
| 2025/0055712 A1 | 2/2025 | Kim et al. |
| 2025/0061137 A1 | 2/2025 | Higgins et al. |
| 2025/0063042 A1 | 2/2025 | Kim et al. |
| 2025/0068966 A1 | 2/2025 | Mandlekar et al. |
| 2025/0069456 A1 | 2/2025 | Carter |
| 2025/0077681 A1 | 3/2025 | Sen |
| 2025/0077849 A1 | 3/2025 | Deziel et al. |
| 2025/0080561 A1 | 3/2025 | Dayan et al. |
| 2025/0080612 A1 | 3/2025 | Hyun et al. |
| 2025/0085947 A1 | 3/2025 | Jain et al. |
| 2025/0085952 A1 | 3/2025 | Lin et al. |
| 2025/0086223 A1 | 3/2025 | Miranda Bautista et al. |
| 2025/0087342 A1 | 3/2025 | Khosla et al. |
| 2025/0094690 A1 | 3/2025 | Decharms |
| 2025/0095039 A1 | 3/2025 | Tu et al. |
| 2025/0097226 A1 | 3/2025 | Fleming et al. |
| 2025/0097292 A1 | 3/2025 | Sheikh et al. |
| 2025/0104087 A1 | 3/2025 | Subramanian et al. |
| 2025/0104429 A1 | 3/2025 | Biddulph et al. |
| 2025/0106218 A1 | 3/2025 | Jeong et al. |
| 2025/0110570 A1 | 4/2025 | Ottens et al. |
| 2025/0111036 A1 | 4/2025 | Ngiam et al. |
| 2025/0112907 A1 | 4/2025 | McGuinness et al. |
| 2025/0112961 A1 | 4/2025 | Banerjee et al. |
| 2025/0112962 A1 | 4/2025 | Cirello Filho et al. |
| 2025/0113199 A1 | 4/2025 | Derrar et al. |
| 2025/0117486 A1 | 4/2025 | Pickman et al. |
| 2025/0119432 A1 | 4/2025 | Bardhan et al. |
| 2025/0123894 A1 | 4/2025 | Kirk |
| 2025/0123902 A1 | 4/2025 | Long et al. |
| 2025/0124200 A1 | 4/2025 | Chiarenza et al. |
| 2025/0126081 A1 | 4/2025 | Detmer et al. |
| 2025/0126124 A1 | 4/2025 | Shin |
| 2025/0131928 A1 | 4/2025 | Drolet |
| 2025/0133061 A1 | 4/2025 | Gubanov et al. |
| 2025/0139088 A1 | 5/2025 | Weik |
| 2025/0139263 A1 | 5/2025 | Sne et al. |
| 2025/0141907 A1 | 5/2025 | Modasiya et al. |
| 2025/0156166 A1 | 5/2025 | Augst |
| 2025/0156748 A1 | 5/2025 | Rajagopalan et al. |
| 2025/0156898 A1 | 5/2025 | Crabtree et al. |
| 2025/0193268 A1 | 6/2025 | Malik et al. |
| 2025/0202903 A1 | 6/2025 | Fry et al. |
| 2025/0227109 A1 | 7/2025 | Friedman et al. |
| 2025/0232351 A1 | 7/2025 | Tao et al. |
| 2025/0238452 A1 | 7/2025 | Ellis |
| 2025/0240301 A1 | 7/2025 | Meltsner et al. |
| 2025/0240326 A1 | 7/2025 | Kelly et al. |
| 2025/0245311 A1 | 7/2025 | Hassard et al. |
| 2025/0247393 A1 | 7/2025 | Zhang et al. |
| 2025/0260741 A1 | 8/2025 | Madhwani et al. |
| 2025/0265062 A1 | 8/2025 | Rajagopalan et al. |
| 2025/0265361 A1 | 8/2025 | Wen et al. |
| 2025/0274466 A1 | 8/2025 | Narayan et al. |
| 2025/0284828 A1 | 9/2025 | Kallarakuzhi |

OTHER PUBLICATIONS

Lehmann et al "Functional Flexibility in Generative AI Interfaces: Text Editing with LLMs through Conversations, Toolbars and Prompts," pp. 1-54 (Year: 2024).

Sarkar et al Participatory Prompting: a User-Centric Research Method for Eliciting AI assistance Opportunities in Knowledge Workflows, pp. 1-12 (Year: 2023).

Non-Final Office Action from related U.S. Appl. No. 19/043,153; dated May 21, 2025.

Choi, Hoyoung, et al., "Consistency of Code: A prompt based approach to comprehend functionality," 2023 30th Asia-Pacific Software Engineering Conference (APSEC), IEEE, DOI: 10.1109/APSEC60848.2023.00095, Dec. 2023, pp. 655-656. (2 pages).

Clarisó, Robert and Jordi Cabot, "Model-Driven Prompt Engineering," 2023 ACM/IEEE 26th International Conference on Model Driven Engineering Languages and Systems (MODELS). IEEE, DOI: 10.1109/MODELS58315.2023.00020. Oct. 2023. pp. 47-54. (8 pages).

Non-final Office Action from corresponding U.S. Appl. No. 19/043,153, issued Sep. 24, 2025 (47 pages).

\* cited by examiner

FIG. 9A

LANGUAGE MODEL AUTOMATIONS

CROSS-REFERENCE TO RELATED APPLICATIONS

This application claims priority to and the benefit of U.S. provisional application No. 63/745,280, filed on Jan. 14, 2025, which is expressly incorporated by reference herein in its entirety.

BACKGROUND

Generative response engines, such as large language models, represent a significant milestone in the field of artificial intelligence, revolutionizing computer-based natural language understanding and generation. Powered by advanced deep learning techniques, generative response engines have demonstrated astonishing capabilities in tasks such as text generation, translation, summarization, and even code generation. Generative response engines can sift through vast amounts of text data, extract context, and provide coherent responses to a wide array of queries.

New uses and applications leveraging the power of generative response engines can be developed. The systems and methods disclosed herein represent a new application leveraging this power.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

FIGS. 9A-9C illustrate successful examples of the system performing an automations request in accordance with some embodiments.

DETAILED DESCRIPTION

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation.

Many generative response engines provide a conversational user interface powered by a chatbot, whereby the user account interacts with the generative response engine through natural language conversation. Such a user interface provides an intuitive format for providing prompts or instructions to the generative response engine. In fact, the conversational user interface powered by the chatbot can be so effective that users can feel as if they are interacting with a person. Some users find the generative response engine effective enough that they utilize the conversational user interface powered by the chatbot as they would an assistant.

One area in which a chatbot may be used as an assistant is scheduling automated actions such as reminders, tracking and reporting on processes, or providing briefings/summaries of news or events. These automated, future tasks are herein referred to as automations. Generally, generative response engines lack a concept of time, which can be remedied by augmenting a generative response engine with an automations engine that can recognize when a request/prompt from a user includes an automation request. In response to the automation request, the automations engine can determine an automation event that triggers a delayed action, which is specified in the automation request. For example, the automations engine can map the temporal component of the automation request to a time-and-date value, which is sent as a scheduling instruction to a scheduler (e.g., a calendar application). At the scheduled time, the scheduler sends a notification to the automations engine to trigger the delayed action. Often, the delayed action is realized using one or more conversation turns between the generative response engine and the automations engine, which acts as a delegate of the user. The results of the delayed action are then appended to the prior conversation between the user and the generative response engine, and a notification (e.g., a push notification, text, or email) is sent to the user, notifying them that the automation was performed and that the conversation has been updated.

Figure 1:
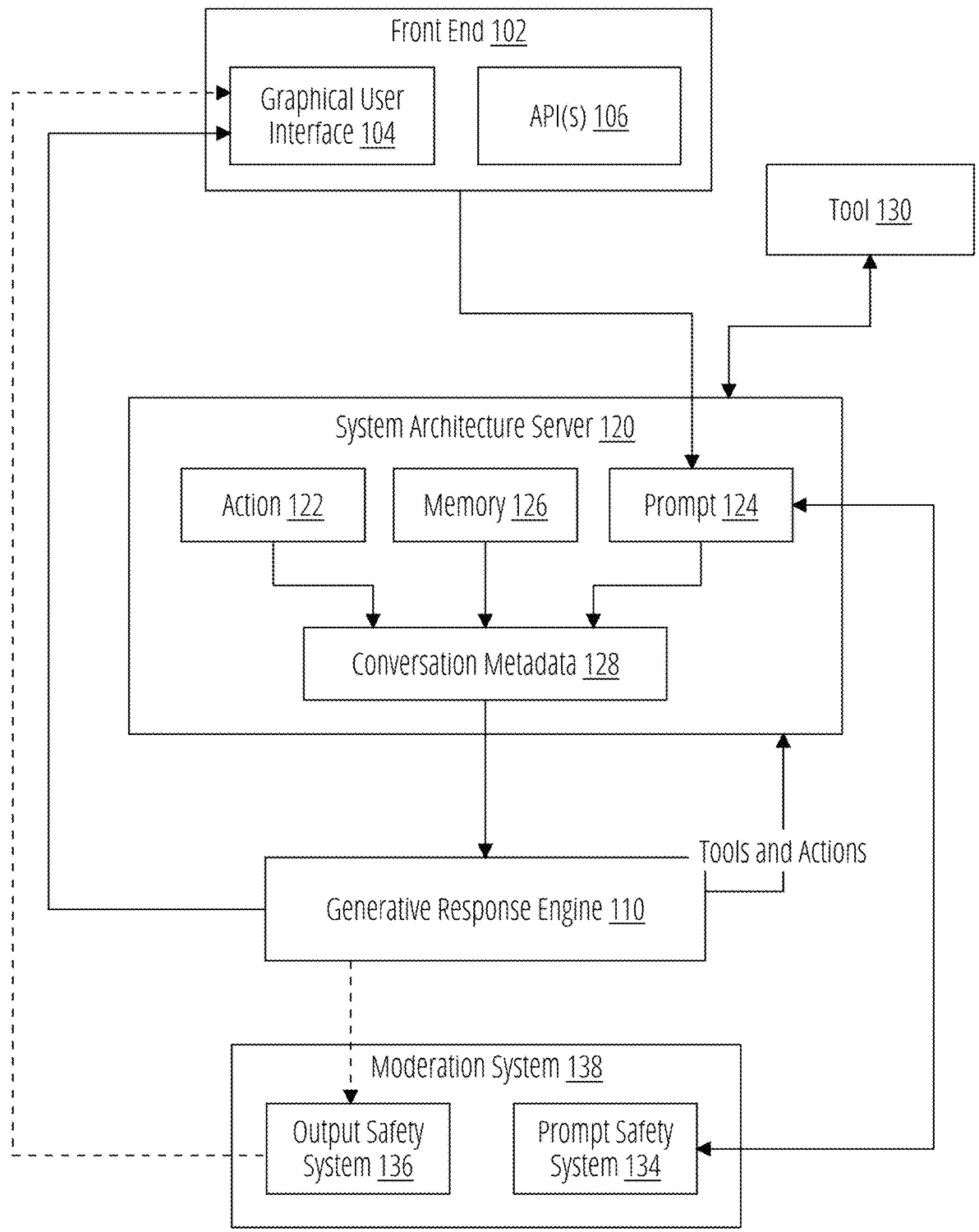
FIG. 1 illustrates an example system supporting a generative response engine during inference operations in accordance with some embodiments.

According to certain non-limiting examples, the conversation can include metadata, such as conversation metadata 128 illustrated in FIG. 1. The metadata can include, among other things, timestamps and sources of the prompts and responses. For example, the metadata can label parts of a conversation as originating from the user, language model, automations engine, or automations engine acting as the user's delegate.

Further, the results of the delayed action that are appended to the prior conversation can be the entire conversation resulting from the delayed action, a summary of the conversation resulting from the delayed action, just the language model's response to the delayed prompt, or other mechanism for communicating the results of the delayed action to the user. For example, the delayed action for an automation based on the prompt "Remind me to check the oven in five minutes" might be satisfied by sending a push notification to the user's phone to "check the oven" and/or a haptic or auditor signal with minimal information appended to the conversation thread.

Often, generative response engines/language models are operated by using a tokenized prompt and a set of previously generated tokens to generate the next token. This process does not inherently include a concept of time. The automations engine generates an awareness of time such that the language model can act in accordance with a user prompt that instructs the language model to perform a future action.

To provide an awareness of time, an automations engine can supplement the generative response engine/language model by detecting when temporal concepts are invoked by a user's request/prompt, and, more specifically, when an action is being requested in the future. A prompt can include a temporal component and an action component. For example, in the prompt "each morning at 8:30 AM, provide me a summary of the latest technology news," the temporal component is "each morning at 8:30 AM" and the action component is "provide me a summary of the latest technology news." When a prompt is identified as having a temporal component, the automations engine translates the temporal component into a scheduling instruction that is in a format that can be understood by a scheduler, and the scheduling instruction is sent to the scheduler, which sends a notification/message to the automations engine upon the occurrence of the scheduled time/event.

For example, at the scheduled time, the scheduler sends a message to the automations engine that the automation event has occurred, and the automations engine initiates the delayed action. The automations engine can act as a delegate of the user and send a delayed prompt that is directed to performing the delayed action. For example, each morning at 8:30 AM, the automations engine can act in place of the user by sending a prompt "provide me a summary of the latest technology news." The information generated in response to the prompt can then be appended to the user's conversation thread. To provide a more fully informed response to the prompt, the automations engine can provide the context within which the prompt was given, for example, by including the prior conversation thread. Further, the prompt for the recurring delayed action can be modified based on subsequent conversation threads.

According to certain non-limiting examples, the automations engine determines whether a prompt from the user includes an automation request (i.e., a request for a delayed action and a time at which the delayed action is to be performed), and the automations engine performs the delayed action at the requested time. For example, the automations engine can translate the temporal component of a prompt into a format that is comprehensible to a scheduler (e.g., a scheduling instruction that is formatted using the iCalendar standard), and the scheduler notifies the automations engine when the scheduled event occurs, triggering the automations engine to perform the delayed action.

According to certain non-limiting examples, the automations engine can be configured to process prompts that are based on the concepts of "now" and relative times. For example, the prompt "in 5 minutes, remind me to XXX" can be processed by recognizing that "in 5 minutes" means five minutes from now. To process this automation request, the automations engine can access the current time and add five minutes to generate the time-and-date value of the automation event. For example, the current time can be determined using timestamps in the message metadata of the prompt. Additionally or alternatively, the current time can be determined by calling a tool that provides the current time. Alternatively, instead of determining the current time, the scheduling instruction can be expressed using relative time. For example, the scheduler may have a timer function that can be configured to count down five minutes and then send a notification.

According to certain non-limiting examples, the automations engine can be configured to ensure the security of the session by providing a mechanism to authenticate the automations engine as a delegate of the user when establishing a delayed session between the automations engine and the language model. For example, the automations engine can convert a session authentication token to a persistent authentication token, which is stored until the automation event occurs, causing the persistent authentication token to establish a session between the automations engine and the language model.

According to certain non-limiting examples, the automations engine can include a large language model (LLM) adapter or other mechanisms that enable the automations engine, when acting as a delegate of the user, to express prompts as though coming from the user. For example, the automations engine can use the language model to generate delayed prompts, such that interactions or turns between the automations engine and the language model are essentially the language model interacting/conversing with itself.

According to certain non-limiting examples, recurring automations with a short period may result in back-pressure issues and/or rate-limit issues. Further, back-pressure issues may arise if many users select the same time for their respective automations, resulting in the language model processing a significant confluence of automations at the same time. This can also occur when users fail to specify a time, and the same time is assigned to these automations by default. Accordingly, the automations engine can be configured with one or more mechanisms to alleviate back-pressure issues and/or rate-limit issues. For example, the default times can be spread over a range of times. Further, the automations engine can limit the frequency/period of recurring automations.

Additionally, when back-pressure issues do arise because many automations are scheduled for the same time, the system (e.g., the automations engine) can select a subset of automations to be preprocessed at an earlier time when there is a lull in the number of jobs/prompts that the system/language model is being asked to process. The subset of automations to be preprocessed at the earlier time can be selected based on the time sensitivity of the delayed action, such that the subset of earlier processed delayed action are less time sensitive. For example, a delayed for generating a summary of the weather report or news can be less time sensitive than a delayed action related stock prices immediately after a government issued economics report (e.g., employment reports, inflation reports, GDP reports, durable goods orders, consumer confidence surveys, retail sales data, or Federal Reserve interest rate announcements) because stock prices can change more quickly than the weather and the time to act on such information can typically have a shorter time horizon. According to certain non-limiting examples, the automations engine is fine-tuned using a supervised fine-tuning method in which the training data includes prompts with automation requests that are labeled according to the time sensitivity of the requested delayed action.

According to certain non-limiting examples, the automations engine can be configured with various mechanisms for handling temporal content that is ambiguous, complicated, or cannot otherwise be mapped to an automation event.

According to certain non-limiting examples, the automations engine can be configured to be aware of context of tasks to be automated and the limitations of what the automations engine can achieve. For example, the automations engine can be configured to determine any prerequisites that need to be satisfied before the automations can be performed. Examples of prerequisites can include, but are not limited to, permissions settings for performing one or more parts of the automation, applications that must be installed to perform the automations, etc. The automations engine can handle those prerequisites that do not require user action, and the automations engine can inform the user regarding those prerequisites that require user action.

According to certain non-limiting examples, the automations engine can be configured to preserve/capture the context within which the automation request was made and within which the delayed action is taken. For example, the context can be provided by including the conversation thread history in the inputs used by the automations engine to generate the delayed prompt and/or the delayed action.

As discussed below for FIG. 4A, the thread history can include intervening conversations that have occurred after the original automation request. For example, the automation request "every morning, tell me a joke" presumably means tell me a different joke every morning—not reusing the same joke every morning. To avoid reusing the same jokes, the language model can refer to the context provided by previous conversations (e.g., which jokes have previously been used).

Further, the context provided by the conversation thread history can enable the automations engine to better act as a delegate of the user. For example, the context enables the automations engine to ask follow-up questions. For example, the delayed action can include multiple conversation turns between the automations engine and the language model.

Further, when the automation includes a recurring delayed action, the intervening conversations can provide additional guidance from the user regarding the delayed action. For example, an automation request can be "Each morning, provide me with a summary of the latest technology news." The delayed action for this automation request may be that, each morning at 9:00 AM, the automations engine sends a prompt "Tell me the technology news from the last 24 hours." If, one morning, the user responds to the resulting news summary by writing "This summary is great, except I am not interested in the news about crypto," then the prompt can be updated as "Tell me the technology news from the last 24 hours, omitting news about crypto."

FIG. 1 illustrates an example system supporting a generative response engine during inference operations in accordance with some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

The generative response engine 110 is an artificial intelligence (AI) that can generate content in response to a prompt. The prompt can be from a human or a software entity (AI or applications). The prompt is generally in natural language but could be in code, including binary. Some examples of the generative response engine can include language models that generate language, such as CHATGPT, or other models, such as DALL-E, which generates images, and SORA, which generates videos. CHATGPT, DALL-E, and SORA are all provided by OPENAI, but the generative response engine is not limited to AI provided by OPENAI. The generative response engine can also be any type of generative AI and can include AI developed using various architectures such as diffusion models and transformers (e.g., a generative pre-trained transformer) and combinations of models.

In some instances, a language model, such as CHATGPT, can receive prompts to output images, video, code, applications, etc., which it can provide by interfacing with one or more other models, as will be addressed further herein.

Users and applications can interact with the generative response engine 110 through the front end 102. The front end 102 serves as the interface and intermediary between the user and the generative response engine. It encompasses the graphical user interface 104 and Application Programming Interfaces (APIs) 106 that facilitate communication, input processing, and output presentation. Generally, users interact through a graphical user interface 104 that often includes a conversational interface, and applications interact through the API 106, but this is not a requirement.

The graphical user interface 104 is the platform through which users interact with the generative response engine 110. It can be a web-based chat window, a mobile application, or any interface that supports data input and output. The graphical user interface 104 facilitates a conversation between the user and the generative response engine, as the user provides prompts in the graphical user interface 104 to which the generative response engine responds and presents those responses in the graphical user interface 104. In some embodiments, graphical user interface 104 presents a conversational interface, which has attributes of a conversation thread between a user account and generative response engine 110.

The graphical user interface 104 is configured to perform input handling, context management, and output presentation. The type of inputs that can be received can be relative to the specifics of the generative response engine 110. But even when a model doesn't directly accept certain types of inputs, the front end 102 might be able to receive different types of inputs, which can be converted to inputs that are accepted by the generative response engine 110. For example, a language model is generally configured to accept text, but the front end 102 can accept voice and convert it to text or accept an image and create a textual representation.

The graphical user interface 104 is also configured to maintain the context of the conversation, which allows for coherent and relevant responses. For example, the graphical user interface 104 is responsible for providing the conversation thread and other relevant context accessible to the front end 102 to the generative response engine along with the specific prompt to the generative response engine. In an example, a conversation between the user account and the generative response engine 110 can have taken several turns (prompt, response, prompt, response, etc.). When the user account provides a further prompt, the graphical user interface 104 can provide that prompt to the generative response engine in the context of the entire conversation.

In another example, the front end 102 might have access to a memory 126 where facts about the user account have been stored. In some embodiments, these facts can have been identified as facts worth storing by the generative response engine and the front end 102 has stored these facts at the direction of the generative response engine. Accordingly, these facts can be provided to the generative response engine 110 along with a user-provided prompt so that the generative response engine has access to these facts when generating a response.

In another example, the graphical user interface 104 might be configured to provide a system prompt along with a user-provided prompt. A system prompt is hidden from the user account and is used to set the behavior and guidelines for the generative response engine. It can be used to define the AI's persona, style, and constraints.

The graphical user interface 104 is also configured to display the responses from the generative response engine, which might include text, code snippets, images, or interactive elements.

In some embodiments, the generative response engine 110 can provide instructions to the front end 102 that instruct the graphical user interface 104 about how to display some of the output from the generative response engine. For example, the generative response engine can direct the graphical user interface 104 to present code in a code-specific format, or to present interactive graphics, or static images. In other examples, the generative response engine can direct the graphical user interface 104 to present an interactive document editor where the graphical user interface 104 can be presented with the document editor so that the user account and the generative response engine can collaborate on the document. In some embodiments, the generative response engine 110 can provide instructions to the front end 102 to record facts in a personalization notepad. Accordingly, the graphical user interface 104 does not always display all of the output of the generative response engine.

As noted above, the front end 102 can also provide one or more application programming interfaces (API(s)) 106. APIs enable developers to integrate the generative response engine's capabilities into external applications and services. They provide programmatic access to the generative response engine, allowing for customized interactions and functionalities.

The APIs 106 can accept structured requests containing prompts, context, and configuration parameters. For example, an API can be used to provide prompts and divide the prompt into system prompts and user prompts. In some embodiments, the APIs 106 can provide specific inputs for which the generative response engine 110 is configured to respond with a specific behavior. For example, an API can be used to specify that it requires an output in a particular format or structured output. For example, in the chat completion API, the API call can specify parameters for the output, such as the max length for the desired output, and specify aspects of the tone of the language used in the response. Some common APIs are for participating in a conversation (Chat Completion API), for providing a single response (Completion API), for converting text into embeddings (Embeddings API), etc. The API can also be used to indicate specific decision boundaries that the generative response engine 110 might be trained to interpret. For example, the moderation API can take advantage of the generative response engine's content moderation decision-making. In the case of the moderation API and others, the API might give access to services other than the generative response engine. For example, the moderation API might be an interface to moderation system 138, addressed below.

Some other common APIs include the Fine-Tuning API, which allows developers to customize models of the generative response engine using their own datasets; the Audio and Speech APIs, which cause the generative response engine to output speech or audio; and the Image Generation API, which causes the generative response engine to output images (which might require utilizing other models).

There can also be APIs that direct the generative response engine to interface with other applications or other generative AI engines. In such cases, the specific application or AI engine might be specified, or the generative response engine might be allowed to choose another application of AI engine to utilize in response to a prompt.

In short, the graphical user interface 104 and the APIs 106 can be used to provide prompts to the generative response engine. Prompts are sometimes differentiated into prompt types. For example, a system prompt can be a hidden prompt that sets the behavior and guidelines for the generative response engine. A user prompt is the explicit input provided by the user, which may include questions, commands, or information.

Sitting in between front end 102 and generative response engine 110 is a system architecture server 120. The function of system architecture server 120 is to manage and organize the flow of data among key subsystems, enabling the generative response engine 110 to generate responses that are contextually relevant, accurate, and enriched with additional information as required.

Action 122 facilitates auxiliary tasks that extend beyond basic text generation. In some embodiments, action 122 can be actions that correspond to an API 106. In some embodiments, action 122 can be agentic actions that the generative response engine 110 decides to take to carry out a user's intent as described in the prompt.

Prompt 124 is the request or command provided by the user account through front end 102. In some embodiments, prompt 124 can be further supplemented by a system prompt and other information that might be included by graphical user interface 104 or API 106. In some embodiments, prompt 124 can even be modified or enhanced by generative response engine 110 as addressed further below. Additionally, as the user account provides prompts and generative response engine 110 provides responses, a conversation thread forms. As the user account provides a new prompt, this is appended to the overall conversation and added to prompt 124. Thus, a user account might think of a first user-provided message as a first prompt and a second user-provided message as a second prompt, and so on, but prompt 124 as perceived by generative response engine 110 can include a thread of user-provided messages and responses from generative response engine 110 in a multi-turn conversation. Generally, prompt 124 will include an entire conversation thread, but in some instances, prompt 124 might need to be shortened if it exceeds a maximum accepted length (generally measured by a number of tokens).

System architecture server 120 can also route prompts and response through moderation system 138, which can be separate or part of system architecture server 120. In some embodiments, prompts are provided to prompt safety system 134 before being provided to generative response engine 110. Prompt safety system 134 is configured to use one or more techniques to evaluate prompts to ensure a prompt is not requesting generative response engine 110 to generate moderated content. In some embodiments, prompt safety system 134 can utilize text pattern matching, classifiers, and/or other AI techniques.

Since prompts can evolve over time through the course of a conversation, consisting of prompts and responses, prompts can be repeatedly evaluated at each turn in the conversation.

Memory 126 can facilitate continuity and personalization in conversations. It allows the system to maintain user-specific context, preferences, or details that may inform future interactions. A memory file can be persisted data from previous interactions or sessions that provide background information to maintain continuity. In some embodiments, memory can be recorded at the instruction of generative response engine 110 when generative response engine 110 identifies a fact or data that it determines should be saved in memory because it might be useful in later conversations or sessions.

Conversation metadata 128 can aggregate data points relevant to the conversation, including user prompt 124, action 122, and memory 126. This consolidated information package serves as the input for generative response engine 110. Conversation metadata 128 can label parts of a prompt as user provided, generative response engine provided, a system prompt, memory 126, data from action 122 or tool 130 (addressed below).

The generative response engine is the core engine that processes inputs (from system architecture server 120) and generates outputs. In some embodiments, the generative response engine is a Generative Pre-trained Transformer (GPT), but it could utilize other architectures.

A core feature of the generative response engine 110 is to generate content in response to prompts. When the generative response engine 110 is a GPT, it is configured to receive inputs from front end 102 that provide guidance on a desired output. The generative response engine can analyze the input and identify relevant patterns and associations in the data, and it has learned to generate a sequence of tokens that is predicted as the most likely continuation of the input. The generative response engine 110 generates responses by sampling from the probability distribution of possible tokens, guided by the patterns observed during its training. In some embodiments, the generative response engine 110 can generate multiple possible responses before presenting the final one. The generative response engine 110 can generate multiple responses based on the input, and these responses are variations that the generative response engine 110 considers potentially relevant and coherent.

In some embodiments, the generative response engine 110 can evaluate generated responses based on certain criteria. These criteria can include relevance to the prompt, coherence, fluency, and sometimes adherence to specific guidelines or rules, depending on the application. Based on this evaluation, the generative response engine 110 can select the most appropriate response. This selection is typically the one that scores highest on the set criteria, balancing factors like relevance, informativeness, coherence, and content moderation instructions/training.

In some embodiments, an instruction provided by an API 106, a system prompt, or a decision made by generative response engine 110 can cause the generative response engine 110 to interpret a prompt and re-write it or improve the prompt for a desired purpose. For example, generative response engine 110 can determine to take a prompt to make a picture and enhance the prompt to yield a better picture. In these instances, generative response engine 110 can generate its own prompts, which can be provided to a tool 130 or provided to generative response engine 110 to yield a better output response than the original prompt might have.

The generative response engine 110 can also do more than generate content in response to a prompt. In some embodiments, the generative response engine 110 can utilize decision boundaries to determine the appropriate course of action based on the prompt. In some examples, a decision boundary might be used to cause the generative response engine to recognize that it is being asked to provide a response in a particular format such that it will generate its response constrained by the particular format. In some examples, a decision boundary can cause the model to refuse to generate a responsive output if the decision is that the responsive output would violate a moderation policy. In some examples, the decision boundary might cause the generative response engine to recognize that it needs to interface with another AI model or application to respond to the prompt. For example, when the generative response engine is a language model, it might recognize that it is being asked to output an image, and therefore, it needs to interface with a model that can output images to provide a response to the prompt. In another example, the prompt might request a search of the Internet before responding. The generative response engine can use a decision boundary to recognize that it should conduct a search of the Internet and use the results of that search in responding to the prompt. In another example, the prompt might request that the generative response engine take an agentic action on behalf of the user by interacting with a third-party service (e.g., book a reservation for me at . . . ), and the generative response engine can utilize a decision boundary to recognize that it needs to plan steps to locate the third-party service, contact the third-party service, and interact with the third-party service to complete the task and then report back to the user that the action has been completed.

When generative response engine 110 determines that it should take an agentic action on behalf of the user or it should call a tool to aid in providing a quality response to the user account, the generative response engine 110 might call a tool 130 or cause an action 122 to be performed. As indicated above, tools 130 can include internet browsers, editors such as code editors, other AI tools etc. Actions 122 are actions that the generative response engine 110 can cause to be performed, perhaps using tool 130. As used herein actions 122 should be considered to cover a broad array of actions that generative response engine 110 can perform with or without tools 130. Tools 130 are considered to cover a wide variety of services and software that encompass tools such as a computer operating system such that the generative response engine 110 can control the computer operating system on the user's behalf, to robotic actuators, to search browsers and specific applications.

Additionally, the generative response engine 110 can also generate portions of responses that are not displayed to the user. For example, the generative response engine 110 can direct the front end 102 to provide specific behaviors, such as directions for how to present the response from the generative response engine 110 to the user account. In another example, the generative response engine 110 can provide response portions dictated by an API, where portions of the response to the API might be for the consumption of the calling application but not for presentation to the end user.

In some embodiments, the output of generative response engine can be further analyzed by output safety system 136. While generative response engine 110 can perform some of its own moderation, there can be instances where it is desired to have another service review outputs for compliance with the moderation policy. The use of dashed lines in FIG. 1 differentiates a path using output safety system 136 and not using output safety system 136.

While FIG. 1 shows responses being provided back to front end 102 directly, in some embodiments, the responses might be returned by way of system architecture server 120.

Figure 2A:
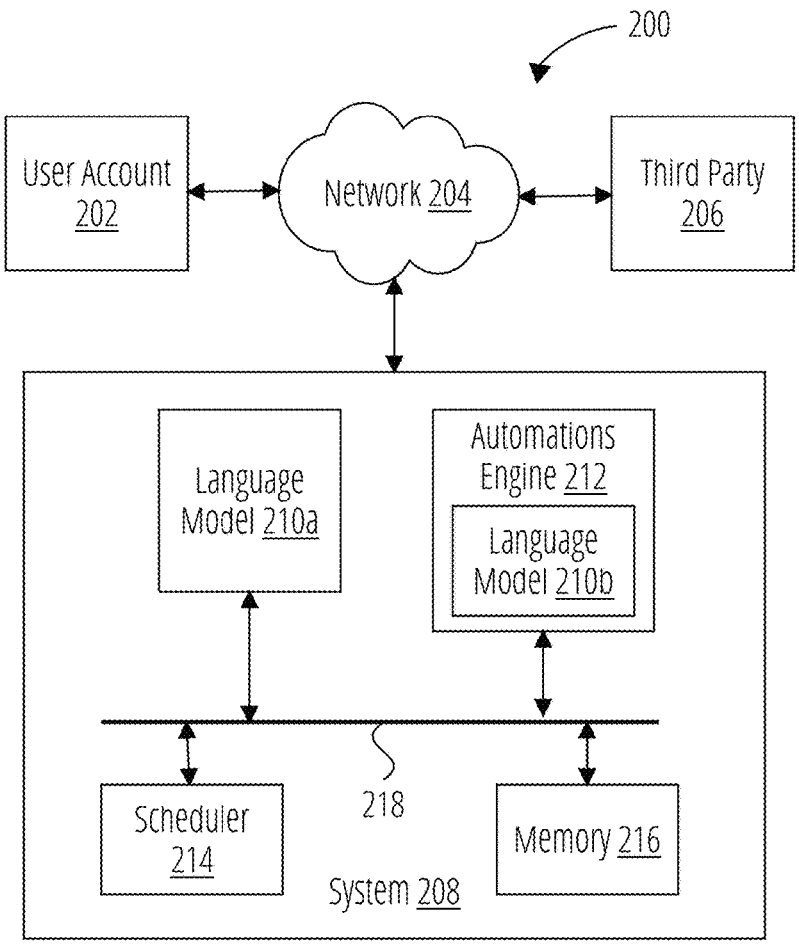
FIG. 2A illustrates a block diagram of an example of a system including a generative response engine and an automations engine in accordance with some embodiments.

FIG. 2A illustrates a block diagram of an example automations system 200 that includes user account 202, network 204, third party 206, and system 208. System 208 includes language model 210a, automations engine 212 (which includes language model 210b), scheduler 214, memory 216, and connection 218.

Components of system 208 are in communication with each other using connection 218. Connection 218 can be a physical connection via a bus, or a direct connection into one or more processors, such as in a chipset architecture. Connection 218 can also be a virtual connection, networked connection, or logical connection.

In some embodiments, system 208 is a distributed system in which the functions described in this disclosure can be distributed within a data center, multiple data centers, a peer network, etc. In some embodiments, one or more of the described system components represents many such components, each performing some or all of the function for which the component is described. In some embodiments, the components can be physical or virtual devices.

Examples of system 208 include at least one processing unit (CPU or processor) and connection 218 that couples various system components including system memory 216, such as read-only memory (ROM) and random access memory (RAM), to one or more processors. System 208 can include a cache of high-speed memory connected directly with, in close proximity to, or integrated as part of a processor.

Language model 210a can be the same as or different from language model 210b. For example, language model 210a can be a generative response engine similar to generative response engine 110. That is, language model 210a participates in a conversation with user account 202 by generating responses to prompts received from user account 202.

In contrast to language model 210a, language model 210b provides a different function in which language model 210b acts as a delegate of the user while performing automations (e.g., automated tasks requested by user account 202). For example, user account 202 can enter a prompt that includes the automation request, such as "each morning provide me with a summary of the latest technology news." In response to this automation request, automations engine 212 generates a delayed action and sends scheduling instructions to scheduler 214, instructing scheduler 214 to send, at the scheduled time, a notification that triggers the delayed action. For example, the scheduling instruction can be for a recurring notification every day at a default morning time (e.g., 8:15 AM in the user's current time zone).

In the delayed action, automations engine 212 acts as a delegate of user account 202. Accordingly, automations engine 212 acts in the user's voice. For example, in response to the automation request "each morning provide me with a summary of the latest technology news," the delayed action can be to send a delayed prompt of "Tell me the technology news from the last 24 hours" to language model 210a.

Automations engine 212 can use language model 210b to generate the delayed prompt. Because the delayed prompt is in the voice of the user (e.g., the prompt is a command to "tell me . . . "), language model 210b can be trained to generate text that indicates it is coming from the user, whereas language model 210a can be trained to generate text responding to the user (e.g., language model 210a is unlikely to use words "me" referring to itself).

To achieve this difference between language model 210b and language model 210a, Language model 210b can be fine-tuned using training data that has been selected to represent prompts generated by a user. Additionally or alternatively, automations engine 212 can use the same language model for both language model 210a and language model 210b, except automations engine 212 includes an LLM adapter that is configured to generate prompts that are expressed as coming from the user (e.g., in the voice of the user). Generating prompts in the voice of the user is beneficial because language model 210a can be a generative response engine that has been trained to respond to prompts from users.

In some embodiments, language model 210a can be a task specific language model that is configured to be better at the specific task than a general purpose language model. For example, the task-specific language model could be fine-tuned version of the language model, or a language model that is configured with system prompts and access to additional knowledge that helps the language model provide better results for the task (an example is a GPT from the GPT store provided by OPENAI).

In addition to generating delayed prompts, automations engine 212 can provide other functions, including, for example: (i) determining whether a prompt includes an automation request, (ii) mapping the temporal component of the automation request to a time-and-date value, (iii) formatting the time-and-date value into a scheduling instruction that conforms to the format of the scheduler, (iv) resolving ambiguity in the temporal components and action components of the automation request, and (v) communicating with external tools and/or services.

According to certain non-limiting examples, automations engine 212 can use a generative response engine together with certain modifications that enable performing specific tasks. For example, automations engine 212 can use a large language model (LLM) that has been fine-tuned for a specific task. Non-limiting examples of methods for fine-tuning include, but are not limited to, full fine-tuning (also referred to as end-to-end fine-tuning), adapter-based fine-tuning, partial fine-tuning (freezing some layers), a combination of prompt engineering and fine-tuning, and low-rank adaptation (LoRA), parameter-efficient fine-tuning (PEFT), multi-task learning, reinforcement learning, regularization techniques, and adding task-specific layers.

According to certain non-limiting examples, the specific tasks for which the LLM used by automations engine 212 is fine-tuned can include reinforcement learning and/or supervised fine-tuning. Further, the used by the automations engine 212 is fine-tuned using parameter efficient fine-tuning.

The specific tasks for which the LLM used by automations engine 212 is fine-tuned can include prompt generation for automations, mapping descriptions of time to time-and-date values, determining whether descriptions of time are vague, ambiguous, or otherwise fail to cleanly map to time-and-date values, and generate/recommend alternative automation requests when automation requests received from the user are outside the capabilities of automations engine 212 or otherwise present obstacles that prevent their performance (e.g., when the automation requests required prerequisites that are not yet satisfied).

In full fine-tuning, all parameters of the model are fine-tuned using a task-specific dataset. For example, a pre-trained model undergoes additional training using a new, task-specific dataset. This allows the model to adjust all of its parameters to better solve the specific task.

Adapters are small modules that are inserted into a pre-trained model to allow task-specific customization without modifying the entire model. These adapters are trained while the rest of the model's parameters remain frozen. For example, adapters can be lightweight neural networks (e.g., small feedforward networks) that are inserted into the layers of the model. Only the parameters of the adapter are updated during fine-tuning, while the rest of the model (usually the transformer layers) remains frozen. This makes the fine-tuning process computationally efficient.

Another approach for fine-tuning is to unfreeze only certain parts of the model and fine-tune those layers while keeping the rest of the model frozen. This can save computational resources and prevent overfitting, e.g., when the dataset is small. Partial fine-tuning can be realized by selectively unfreezing some of the model's layers, such as the top few transformer layers (e.g., the last one to two layers of the transformer network). These unfrozen layers can capture high-level, task-specific features, while the lower layers capture more general language knowledge. Only the unfrozen layers are trained on your task-specific data, and the rest of the model's parameters are frozen (i.e., they are not updated during backpropagation).

According to certain non-limiting examples, fine-tuning can also be combined with prompt engineering techniques. Prompt engineering involves designing specific prompts that can guide the model to perform a given task effectively. For example, if you want the model to answer questions, you could prepend each input with "Answer the following question:" or "Summarize the text below." After selecting one or more prompt formulations, the model can be fine-tuned on the selected prompts to improve its performance for the specific task.

Low-rank adaptation (LoRA) is a method that introduces low-rank matrices into the model to adjust the output of each layer without significantly increasing the number of parameters, thereby providing efficient fine-tuning. Instead of fine-tuning all the weights in the model, LoRA introduces small learnable matrices into specific parts of the model (e.g., attention heads or feed-forward layers) and adapts only those matrices during fine-tuning. This approach can be parameter-efficient and computationally cheaper than full fine-tuning, making it beneficial for fine-tuning very large models.

There are other methods of fine-tuning. Parameter-efficient fine-tuning (PEFT) minimizes the number of parameters that need to be updated during fine-tuning, making it efficient for resource-constrained scenarios. In multi-task learning, the model is trained on multiple related tasks simultaneously to improve generalization and capture common patterns across different domains. Reinforcement learning uses reward systems to guide the model's learning process and fine-tune its behavior toward optimal decision-making in specific scenarios. Regularization techniques such as dropout or L1/L2 regularization can be used to prevent overfitting and improve model stability during fine-tuning.

In instruction fine-tuning, the model is trained using explicit instructions and examples to guide its responses for a particular task. Prompt engineering uses carefully crafted prompts to steer the LLM toward generating the desired output for the specific task. Few-shot learning fine-tunes the model with a limited number of examples to adapt to new tasks quickly.

Figure 2B:
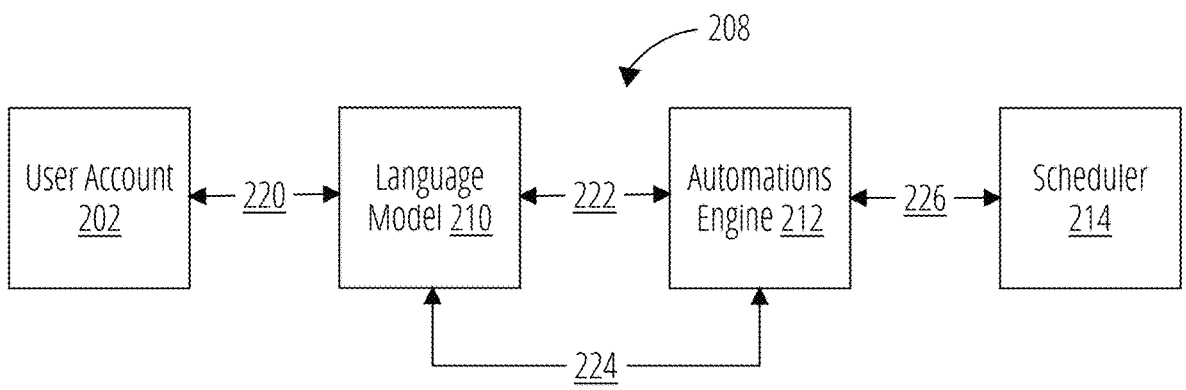
FIG. 2B illustrates a functional diagram of an example of a system including a generative response engine and an automations engine in accordance with some embodiments.

FIG. 2B illustrates a functional diagram of an example of system 208. FIG. 2B illustrates the non-limiting example in which automations engine 212 uses language model 210, rather than using separate language models for the response generation and the automations engine (e.g., language model 210a and language model 210b) for the various tasks performed by automations engine 212, such as generating delayed prompts.

Conversations 220 between user account 202 and language model 210 can include communications back and forth in which user account 202 sends a prompt (e.g., a question or a command) to language model 210, and language model 210 replies by sending a response to user account 202. Upon receiving the response, user account 202 can send a second prompt asking for clarification/additional detail related to the response, or the second prompt can be unrelated to the first prompt. Language model 210 then responds to the second prompt, and so forth until language model 210 receives a prompt that includes an automation request.

According to certain non-limiting examples, when language model 210 receives an automation request, language model 210 forwards the automation request to automations engine 212 via automation communications 222.

Additionally or alternatively, automations engine 212 rather than language model 210 may provide the functionality to determine whether the prompt includes an automation request. In this case, language model 210 uses automation communications 222 to forward each prompt from the user account 202 to automations engine 212. Then automations engine 212 analyzes the prompts to determine which of the prompts include automation requests.

Automation communications 222 can also include communications from automations engine 212 for performing the requested automations. For example, an automation request can be "each morning, provide me with a summary of the latest technology news." In response to this automation request, automations engine 212 generates a delayed action and sends scheduling instructions to scheduler 214 to receive a notification that triggers the delayed action. The delayed action can be sending a delayed prompt of "Tell me the technology news from the last 24 hours" from automations engine 212 to language model 210. Then, upon receiving the notification that triggers the delayed action, automations engine 212 sends via automation communications 222 the delayed prompt to language model 210.

Scheduling communications 226 between automations engine 212 and scheduler 214 can include the scheduling instructions sent from automations engine 212 to scheduler 214 and the notification sent from scheduler 214 to automations engine 212, which indicates that the scheduled event has occurred. For example, the scheduling instruction for the prompt "each morning provide me with a summary of the latest technology news" can be for a recurring notification every day at a default morning time (e.g., 8:15 AM in the user's current time zone). Then the notification is a signal from scheduler 214 that the time for the automation has occurred.

Response generation 224 represents communications between automations engine 212 and language model 210 in which automations engine 212 uses language model 210 as a tool to perform various actions such as generating the delayed response based on an action component from the automation request. For example, automations engine 212 can send instructions to language model 210 to generate a delayed prompt that achieves the delayed action "each morning, provide me with a summary of the latest technology news," and in response language model 210 can send via response generation 224 a delayed prompt of "Tell me the technology news from the last 24 hours." Additionally or alternatively, automations engine 212 can use language model 210 as a tool to generate a scheduling instruction.

For example, automations engine 212 can send instructions to language model 210 to determine a time-and-date value from a temporal component of the automation request and format the time-and-date value as a calendar event that complies with an iCalendar (or iCal) standard (e.g., the iCal standard is partly specified in RFC-4324 and RFC-5545). The iCal standard is a standard used for exchanging calendar and scheduling information between different applications and systems, allowing users to share events, to-dos, and free/busy time across various platforms. Other scheduler standards include vCalendar (the precursor to iCalendar), iTIP (for managing scheduling actions within iCalendar), and the CalDAV protocol for accessing calendar data on a server. These standards are managed by the Internet Engineering Task Force (IETF) and specified in Request for Comments (RFCs).

According to certain non-limiting examples, automations engine 212 uses automation communications 222 to communicate with language model 210 when acting as a delegate of the user, and automations engine 212 uses response generation 224 when using language model 210 as a tool.

For example, automations engine 212 can include an LLM adapter (e.g., a lightweight neural network) that preprocesses the inputs to language model 210 to provide fine-tuning that adapts language model 210 for the specific task of delayed prompt generation, such that the delayed prompt is expressed in the user's voice with automations engine 212 acting as a delegate of the user. Additionally or alternatively, automations engine 212 can use prompt engineering when sending instructions to language model 210 to generate the delayed prompt. Thus, response generation 224 and automation communications 222 provide different ways for language model 210 and automations engine 212 to interact.

Using automation communications 222, automations engine 212 can conduct a delayed conversation with language model 210 in which automations engine 212 stands in the role of a user sending prompts to language model 210 and receiving responses from language model 210. Using response generation 224, automations engine 212 can use language model 210 as a tool to generate prompts. For example, automations engine 212 can use language model 210 to generate a delayed prompt based on the delayed action from the automation request. Further, automations engine 212 can use language model 210 to generate an additional delayed prompt based on a combination of the delayed action and the responses to the delayed prompt that is received from language model 210. Each prompt from automations engine 212 and response thereto from language model 210 is referred to as a turn. According to certain non-limiting examples, multiple turns can be used to complete the delayed action from the automation request.

In the example shown in FIG. 2B, each turn includes a prompt that is generated by automations engine 212 using language model 210 and a response is generated by language model 210. Thus, the turns between automations engine 212 and language model 210 can be understood as a recursive process in which language model 210 effectively talks to itself mediated/modified by automations engine 212. The turns can continue until the delayed action is complete. Automations engine 212 determines whether language model 210 generates responses as a generative response engine or as a delegate of the user.

In addition to conducting turns for the automation request and forwarding automation request to automations engine 212, automation communications 222 can also be used to communicate authentication tokens, establish sessions, and other tasks for the automations.

Figure 3A:
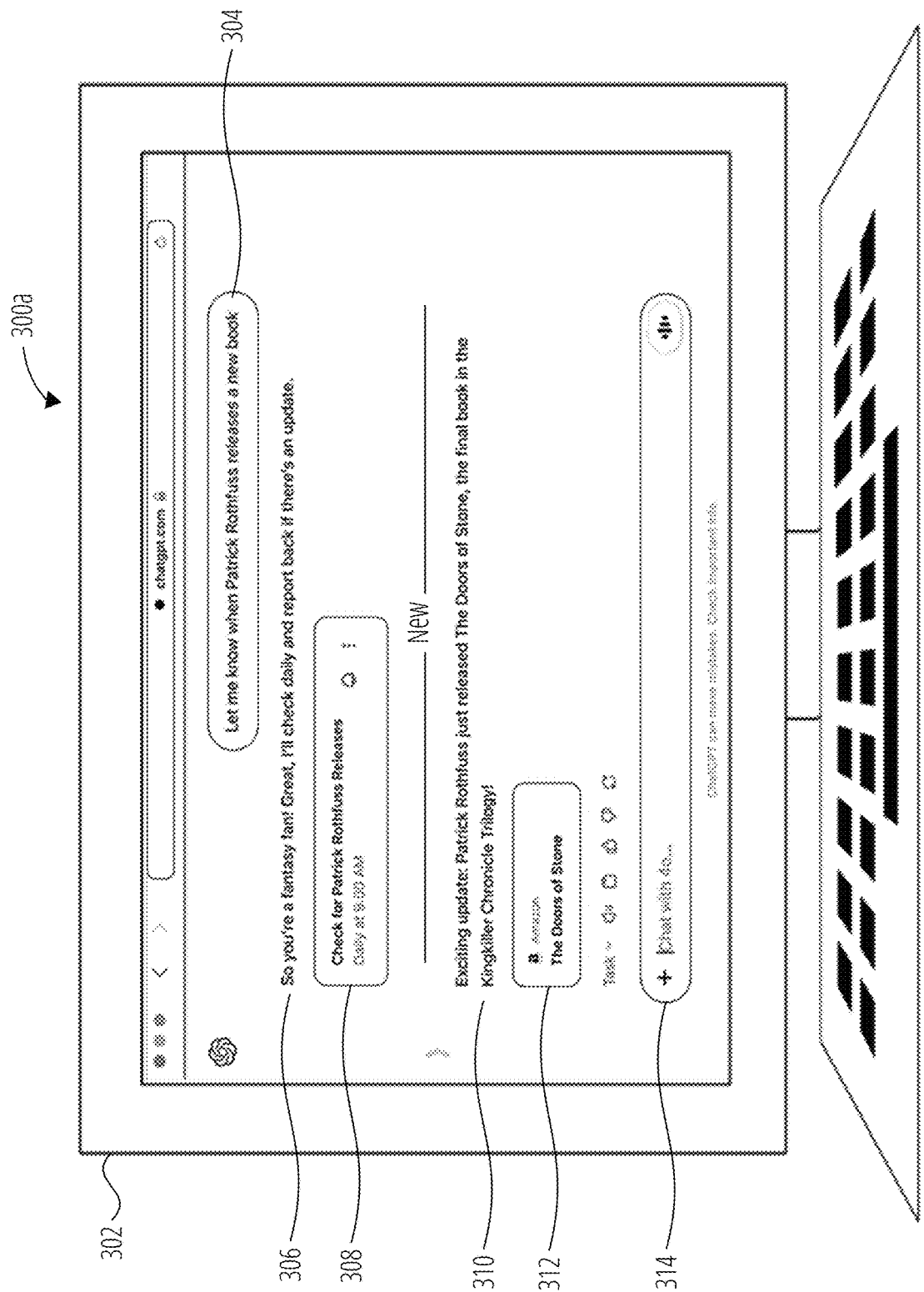
FIG. 3A illustrates an example of a web interface used to communicate automation requests to a system including a language model (e.g., a generative response engine) and an automations engine and to receive automation notifications therefrom in accordance with some embodiments.

FIG. 3A illustrates an example of web interface 300a that can be used by a user to generate and receive notifications of the automation. Web interface 300a can be displayed, e.g., in a web browser on a display of computer 302. A user enters in user input field 314 prompt 304, which includes an automation request, and, in response to the prompt, a combination of language model 210 and automations engine 212 can recognize the automation request and schedule the automation request with scheduler 214. Further, language model 210 can generate and display acknowledgment 306 in the web browser, notifying the user that the automation request was recognized and has been scheduled. Additionally, the web browser can display scheduled automation 308, showing the event that has been scheduled in a scheduler (e.g., a calendar application). A combination of scheduler 214 and automations engine 212 can perform the automation at the scheduled time. When the automation result includes information for the user, automation notification 310 can be generated by a combination of language model 210 and automations engine 212. Automation notification 310 is appended to the conversation thread.

In FIG. 3A, the language model anticipates that the reason for the automation request "Let me know when Patrick Rothfuss releases a new book" is because the user is a fan of fantasy books and is interested in acquiring a copy of new books released by Patrick Rothfuss. Accordingly, the language model determined that a copy of the book could be acquired from an online retailer (e.g., Amazon.com) and provides link to third party 312 that provides easy access for the user to acquire a copy of the new book.

Figures 3B, 3C:
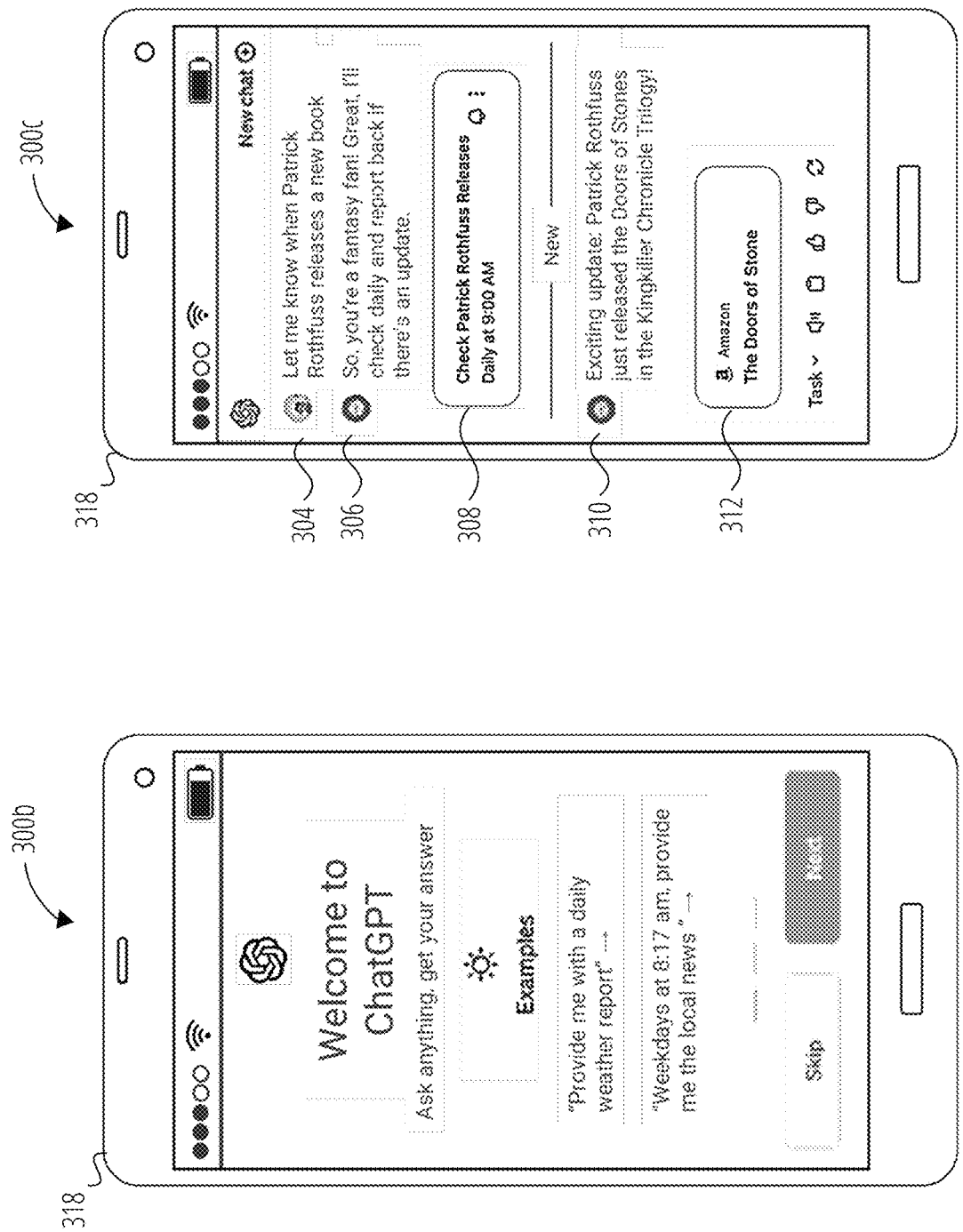
FIGS. 3B-3D illustrate examples of application interfaces used to communicate automation requests to a system including a language model (e.g., a generative response engine) and an automations engine, and to receive automation notifications therefrom, in accordance with some embodiments.

FIG. 3B illustrates an example of first application interface 300b that can be used by a user to sign in to an application on user device 318 (e.g., a smartphone) that provides, via an application programming interface (API), access to system 208.

FIG. 3C illustrates an example of second application interface 300c that can be used by a user to generate and receive notifications of the automation. A user enters a prompt 304, which includes an automation request. In response the prompt, a combination of language model 210 and automations engine 212 can recognize the automation request and schedule the automation request with scheduler 214. Further, language model 210 can generate and display acknowledgment 306 in second application interface 300c to notify the user that the automation request was recognized and has been scheduled. Additionally, the web browser can display scheduled automation 308, showing the event that has been scheduled in a scheduler (e.g., a calendar application on the user device). A combination of scheduler 214 and automations engine 212 can perform the automation at the scheduled time. When the automation result includes information for the user, automation notification 310 can be generated by a combination of language model 210 and automations engine 212. Automation notification 310 is appended to the conversation thread. The application on user device 318 can also provide link to third party 312 to provides easy access for the user to acquire a copy of the new book.

FIG. 3C illustrates an example of lock-screen interface 300d on user device 318. When the scheduled automation appends content to the conversation thread, a push notification 316 can be sent to user device 318 and push notification 316 can be displayed on lock-screen interface 300d, for example. Additionally or alternatively, other mechanisms such as email, texting, audio signals, haptic signals, a visual indicator on an application icon, etc., can be used to notify the user that there is new content on the conversation thread.

Figure 4A:
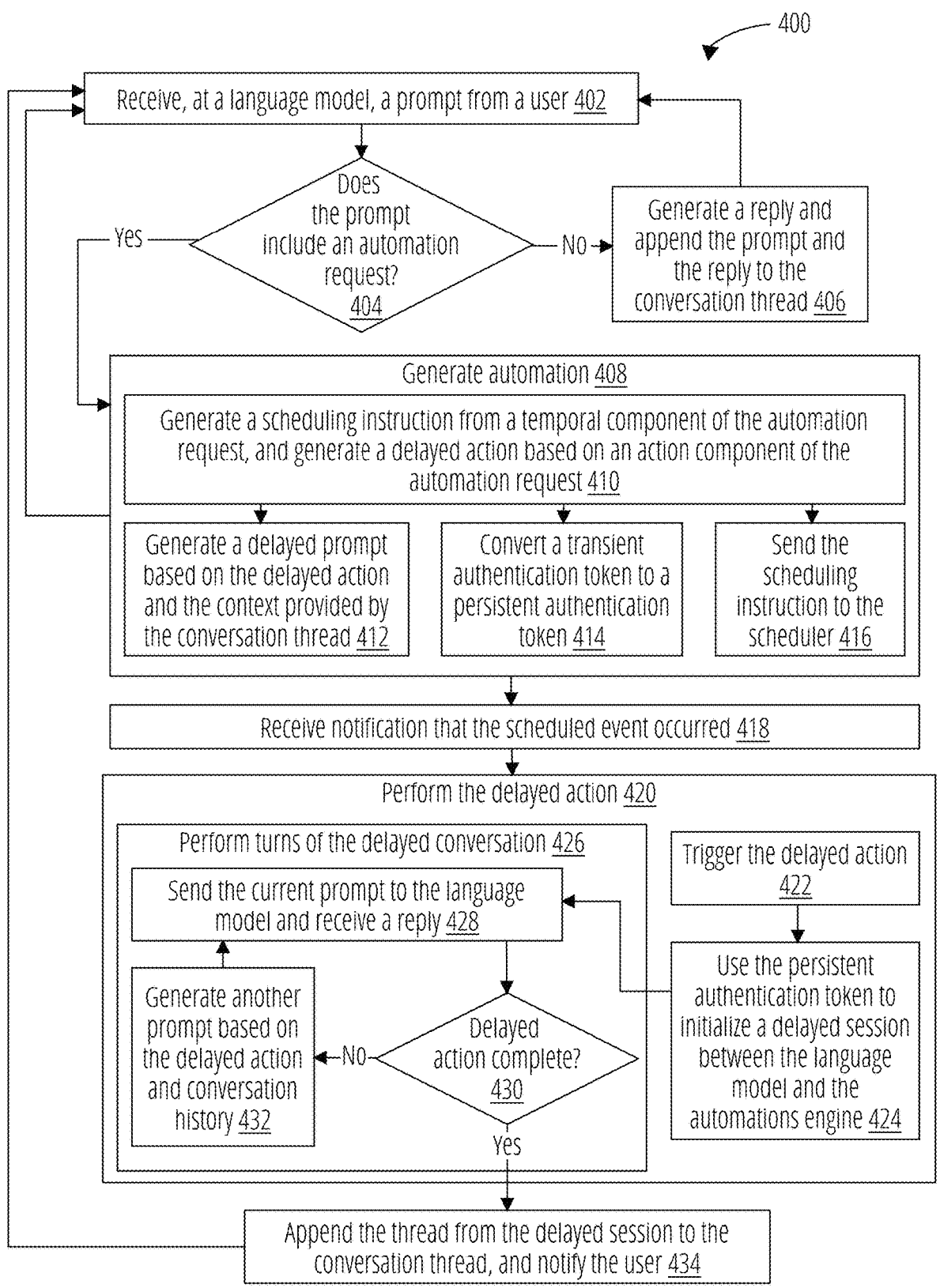
FIG. 4A illustrates a flow diagram of an example implementation of a method for scheduling and performing automations using a system including a language model and an automations engine in accordance with some embodiments.

FIG. 4A illustrates an example method 400 for scheduling and performing automations using a generative response engine. Although the example method 400 depicts a particular sequence of operations, the sequence may be altered without departing from the scope of the present disclosure. For example, some of the operations depicted may be performed in parallel or in a different sequence that does not materially affect the function of method 400. In other examples, different components of an example device or system that implements method 400 may perform functions at substantially the same time or in a specific sequence.

According to some examples, step 402 of the method includes a language model receiving prompt from a user. For example, language model 210 illustrated in FIG. 2B may receive a prompt from a user.

According to certain non-limiting examples, a user account engages in a conversation with a generative response engine (also referred to as the language model) by sending prompts to the language model and receiving responses therefrom. The combination of a prompt from the user together with the response from the generative response engine is referred to as a turn of the conversation. A prompt from the user account can include an automation request to perform a delayed action (e.g., an automated action) on behalf of the user. Thus, each prompt can be analyzed to see if it includes an automation request. When the prompt includes an automation request, an automation is generated such that a delayed action of the automation request can be performed at the time indicated in the automation request. The time for the delayed action can be a time-and-date value (e.g., Tuesday, Dec. 3, 2024 at 8:32 AM Mountain Standard Time (MST)), a time of a repeating event (e.g., every morning at 7:30 AM in my current time zone), a time that is conditioned on another event (e.g., an hour after receiving an email from person "A," if I have not read that email), or a relative time (e.g., in five minutes from now).

According to some examples, decision step 404 of the method inquires whether the prompt from the user account includes an automation request. For example, language model 210 illustrated in FIG. 2B can perform this inquiry. When the prompt lacks an automation request, method 400 continues to step 406, and language model 210 continues to operate as it would without automation generation capabilities. When the prompt from the user account includes an automation request, method 400 continues to process 408.

According to some examples, step 406 of the method includes generating a reply and appending the prompt and the reply to the conversation thread at step 406. For example, language model 210 illustrated in FIG. 2B may generate a reply and append the prompt and the reply to the conversation thread.

According to some examples, process 408 of the method includes generating automation at process 408. For example, automations engine 212 illustrated in FIG. 2A and FIG. 2B may generate automations by performing steps 410, 412, 414, and 416.

According to some examples, step 410 of the method includes generating a scheduling instruction from a temporal component of the automation request and generating a delayed action based on an action component of the automation request. For example, automations engine 212 illustrated in FIG. 2A may generate a scheduling instruction from a temporal component of the automation request, and generate a delayed action based on an action component of the automation request. As discussed above, automations engine 212 can send instructions to language model 210 to determine a time-and-date value from a temporal component of the automation request and format the time-and-date value as a calendar event that complies with the iCal standard.

According to some examples, step 412 of the method includes generating a delayed prompt based on the delayed action and the context provided by the conversation thread. For example, language model 210 illustrated in FIG. 2B may generate a delayed prompt based on the delayed action and the context provided by the conversation thread.

According to certain non-limiting examples, the delayed prompt can be generated at any point before the delayed prompt is sent from automations engine 212 to language model 210. For example, the delayed action can be captured by storing the original prompt together with the context provided by the conversation thread, and then, after receiving a notification that the scheduled event occurred (i.e., step 418), the delayed prompt is generated from the stored prompt and contextual conversation thread.

According to certain non-limiting examples, the automations engine can send instructions to a language model. The instructions can request the generation of a delayed prompt based on the delayed action from the automation request and based on the context provided by the previous conversations with the language model.

According to some examples, step 414 of the method includes converting a transient authentication token to a persistent authentication token. For example, automations engine 212 illustrated in FIG. 2A may convert a transient authentication token to a persistent authentication token. In step 424, the persistent authentication token enables automations engine 212 to establish a session between automations engine 212 and language model 210.

According to some examples, step 416 of the method includes sending the scheduling instruction to the scheduler at step 416. For example, automations engine 212 illustrated in FIG. 2A may send the scheduling instruction to the scheduler 214.

According to certain non-limiting examples, the automation engine sends the scheduling instruction(s) to the scheduler. Scheduling instructions can be formatted according to the standard used by the scheduler (e.g., the iCal standard).

According to some examples, the method includes receiving a notification that the scheduled event occurred at step 418. For example, automations engine 212 illustrated in FIG. 2A may receive a notification that the scheduled event occurred. The automation engine can receive the scheduling notification(s) from the scheduler.

According to some examples, process 420 of the method includes performing the delayed action. For example, a combination of language model 210 and automations engine 212 illustrated in FIG. 2B may perform the delayed action by performing steps 422, 424, 426, 428, 430, and 432.

According to some examples, step 422 of the method includes triggering the delayed action based on receiving a notification from the scheduler that the automation event occurred. For example, scheduler 214 illustrated in FIG. 2A may trigger the delayed action. The delayed action can be triggered when the automation engine receives a notification from the scheduler that the automation event has occurred.

According to some examples, step 424 of the method includes using the persistent authentication token to initialize a delayed session between the language model and the automations engine at step 424. For example, automations engine 212 illustrated in FIG. 2A may use the persistent authentication token to initialize a delayed session between the language model and the automations engine.

According to certain non-limiting examples, the automations engine can store the persistent authentication token, which was generated by converting the transient authentication token from the original session in which the automation request was made. This persistent authentication token is then used to establish a delayed session between the language model and the automations engine, which is as acting as a delegate of the user.

According to some examples, step 426 of the method includes performing turns of the delayed conversation at step 426. For example, automations engine 212 illustrated in FIG. 2A may perform turns of the delayed conversation.

According to certain non-limiting examples, a turn between the automations engine and the language model includes a prompt from the automations engine (e.g., the delayed prompt) and a response from the language model. Sometimes, completion of the delayed action can require only a single turn, while other times completion of the delayed action can require multiple turns.

According to some examples, step 428 of the method includes sending the current prompt to the language model and receiving a reply. For example, automations engine 212 illustrated in FIG. 2A may send the current prompt (e.g., the delayed prompt generated in step 412 or a subsequent prompt generated step 432) to the language model and receive a reply.

According to certain non-limiting examples, a turn is executed between the automations engine and the language model by sending a prompt from the automations engine and receiving the response from the language model. As discussed for FIG. 2B, the turns between automations engine 212 and language model 210 can be understood as a recursive process in which language model 210 effectively talks to itself mediated/modified by automations engine 212. The turns can continue until the delayed action is complete. Automations engine 212 determines whether language model 210 generates responses as a generative response engine or as a delegate of the user. For example, automations engine 212 can use an LLM adapter or other mechanism to modify interactions with language model 210 such that the prompts from automations engine 212 are phrased/expressed such that automations engine 212 is acting as a delegate of the user.

According to some examples, decision step 430 of the method inquires whether the delayed action is complete. For example, automations engine 212 illustrated in FIG. 2A may perform the inquiry as to whether the delayed action is complete. When the delayed action is complete method 400 continues to step 434. Otherwise, method 400 continues to step 432.

According to certain non-limiting examples, the automations engine can compare the delayed action from the automation request with the response from the language model to determine whether the response satisfies/completes the delayed action or whether one or more additional turns are needed to satisfy/complete the delayed action. For example, automations engine can use an engineered prompt to ask the language model whether the current conversation (i.e., the prompts from the automations engine and the responses from the language model) complete the delayed action or if there remain incomplete parts of the delayed action. The automations engine can send the engineered prompt together with the delayed action and the current conversation and use the response to either generate a next prompt or declare the delayed action complete.

According to some examples, step 432 of the method includes generating another prompt based on the delayed action and conversation history. For example, automations engine 212 using language model 210, as illustrated in FIG. 2B, may generate another prompt based on the delayed action and conversation history.

According to certain non-limiting examples, a delayed action can be completed over multiple turns. For example, when a first turn only completes part of the delayed action, the automations engine can use one or more additional turns to complete the other parts of the delayed action. The other parts of the delayed action can be completed by generating another prompt based on the delayed action and the conversation history so far, including, e.g., the original conversation thread, the automation request, the turns of the current, delayed conversation between the language model and the automations engine, and the turns of any intervening conversations between the original conversation and the current, delayed conversation.

For example, intervening conversations can occur when the automation request includes repeated delayed actions such as "every weekday morning, provide me a weather report for my location." Relevant intervening conversations may include additional instructions or guidance for fulfilling the automation request. The repeated delayed actions can be periodic (e.g., every Monday morning) or can be non-periodic (e.g., every holiday on the public school calendar). For example, a recurring or repeated automation request may be "A month before each three day weekend according to the public school calendar, help me plan a local, two-night, family getaway."

Further, intervening conversations can provide helpful context. For example, the automation request "every morning, tell me a joke" presumably means tell me a different joke every morning—not reusing the same joke every morning. To avoid reusing the same jokes, the language model can refer to the context in which jokes have previously been used.

According to some examples, the method includes appending the thread from the delayed session to the conversation thread and notifying the user at step 434. For example, language model 210 illustrated in FIG. 2B may append the thread from the delayed session to the conversation thread, and notify the user. For example, either the language model or the automations engine can append the current delayed conversation to the user's previous conversation thread, and a notification can be sent to the user that the automation request has been fulfilled. As shown in FIG. 2A, the appended conversation thread can include the response and omit the delayed prompt that elicits the response, when the response can stand on its own and does not require the delayed prompt for context. As shown in FIG. 2A, when the response "Exciting update: Patrick Rothfuss just released the Doors of Stones in the Kingkiller Chronicle Trilogy!" is appended immediately following the conversation thread requesting "Let me know when Patrick Rothfuss releases a new book" no additional prefatory remarks are needed for context.

In a different scenario, a daily summary of the latest technology could benefit from prefatory remarks to provide context, such as "In today's update of technology news . . . ," which can be appended to the conversation together with the technology summary generated by the language model.

Figure 4B:
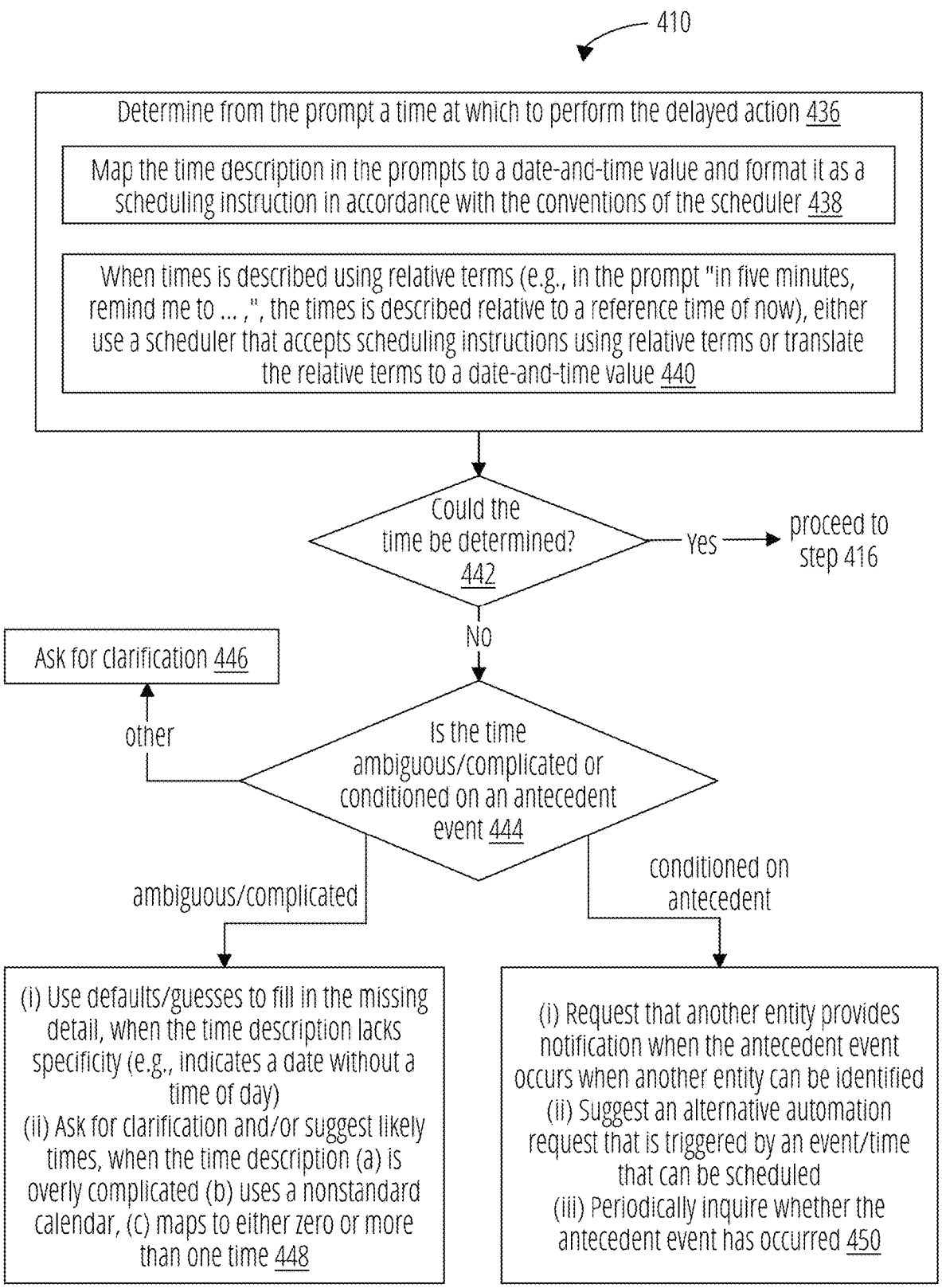
FIG. 4B illustrates a flow diagram of an example of determining the time of an automation in accordance with some embodiments.

FIG. 4B illustrates step 410 in greater detail. Although the example of step 410 depicts a particular sequence of operations, the sequence may be altered without departing from the scope of the present disclosure. For example, some of the operations depicted may be performed in parallel or in a different sequence that does not materially affect the function of step 410. In other examples, different components of an example device or system that implements step 410 may perform functions at substantially the same time or in a specific sequence.

According to some examples, the method includes determining from the prompt a time at which to perform the delayed action at step 436. For example, automations engine 212 illustrated in FIG. 2A may determine from the prompt a time at which to perform the delayed action.

According to some examples, the method includes mapping the time description in the prompts to a date-and-time value and formatting it as a scheduling instruction in accordance with the conventions of the scheduler at step 438. For example, automations engine 212 illustrated in FIG. 2A may map the time description in the prompts to a date-and-time value and format it as a scheduling instruction in accordance with the conventions of the scheduler.

According to some examples, in step 440 the method includes using a scheduler that accepts scheduling instructions using relative terms or translating the relative terms to a date-and-time value, when the times were described using relative terms. Examples of time expressed in relative terms include, e.g., the prompt "in five minutes, remind me to . . . ," in which the time is described as being relative to a reference time of now. For example, automations engine 212 illustrated in FIG. 2A may use a scheduler that accepts scheduling instructions using relative terms or translate the relative terms to a date-and-time value.

For example, in the prompt "in five minutes, remind me to . . . ," the reference time is now and the offset time is five minutes. Thus, a date-and-time value can be generated by retrieving the date-and-time value for now (e.g., a timestamp of the prompt) and adding five minutes to determine the date-and-time value for the scheduling instruction. Alternatively, a scheduler may accept instructions in relative terms. For example, when the scheduler includes a timer function, prompts using now as a reference time can be translated into timer instructions such that the scheduler counts down the specified time (e.g., five minutes) and then sends the notification.

According to some examples, step 442 of the method inquires whether the time could be determined. For example, automations engine 212 illustrated in FIG. 2A may perform the inquiry as to whether the time could be determined. When the time can be and has been determined, method 400 continues to step 416. When the time cannot be determined, method 400 continues to step 444.

According to some examples, step 444 of the method inquires whether the reason that the time could not be determined is because the time is (i) ambiguous or complicated, (ii) the time is conditioned on an antecedent event, or (iii) some other reason. For example, automations engine 212 illustrated in FIG. 2A may perform an inquiry for the reason why the time could not be determined. When the reason why the time could not be determined is that the time component of the automation request is ambiguous or complicated, method 400 continues to step 448. When the reason why the time could not be determined is that the time component of the automation request is the time is conditioned on an antecedent even, method 400 continues to step 450. When the reason why the time could not be determined is that the time component of the automation request is some other reason, method 400 continues to step 446.

According to some examples, the method includes asking for clarification at step 446. For example, a combination of language model 210 and automations engine 212 illustrated in FIG. 2B may ask the user for clarification.

According to some examples, step 448 of the method includes three options for addressing a time component of the automation request that is ambiguous or complicated. For example, automations engine 212 illustrated in FIG. 2A may perform one or more of the three options for addressing a time component of the automation request that is ambiguous or complicated.

A first option to address a time component that is ambiguous or complicated is to use either a default or a guess to fill in the missing detail that is absent from the time component. The first option can be used, e.g., when the time description lacks specificity (e.g., indicates a date without a time of day). For example, the default can be 9:00 AM, or the default can be staggered to avoid a case in which many automations are all scheduled for the same default time resulting in the language model being inundated/overwhelmed with performing automations at the same default time. For example, the default times can be set using a random variable that is sampled from a uniform distribution across a range of times.

When the time component of the automation request is ambiguous, such as when multiple times satisfy the description in the time component, automations engine 212 can select a time from the multiple times based on predictions of the likelihoods of the user's intent. For example, the time that is earliest or the time that most closely matches the context of the conversation can be selected.

A second option to address a time component that is ambiguous or complicated is to ask the user for clarification. For example, asking for clarification can be used when the time description is overly complicated, uses a nonstandard calendar, or maps to either zero times or more than one time. For example, a prompt stating "on the second Tuesday of next week, remind me to schedule a tee time" maps to zero times because there is only one Tuesday per week. Accordingly, automations engine 212 may ask whether the user meant Tuesday next week or Tuesday in two weeks from now.

Examples of nonstandard calendars (e.g., non-Gregorian calendars) may include a Chinese calendar, a Coptic calendar, Solar Hijiri calendar, a lunar calendar, Julian calendar, a solar calendar, etc. Further, events that change dates from year to year (e.g. Easter, which occurs on is first Sunday after the full Moon that occurs on or after the spring equinox) may be complicated to determine several years in the future. In this case, automations engine 212 can ask the user for the exact date to avoid errors.

A third option to address a time component that is ambiguous or complicated is to use a tool or database that can handle more complicated time mappings. For example, the automations engine can request a third-party tool or build a tool that can handle lunar calendars. Additionally or alternatively, the automations engine can access an extensive database that includes hard-to-calculate dates such as Easter a certain time span into the future.

According to some examples, step 450 of the method includes three options for addressing a time component of the automation request that is conditioned on an antecedent event: (i) request that another entity provides notification when the antecedent event occurs, (ii) suggest an alternative automation request that is triggered by an event/time that can be scheduled, (iii) periodically inquire whether the antecedent event has occurred. For example, automations engine 212 illustrated in FIG. 2A may perform one or more of the three options for addressing a time component of the automation request that is conditioned on an antecedent event.

In a first option for addressing a time component that is conditioned on an antecedent event, another entity can be requested to provide a notification when the antecedent event occurs. For example, a prompt "buy tickets to . . . , when the tickets are available" is conditioned on the antecedent event "the tickets are available." In this case, the scheduler 214 might not be able to schedule the occurrence of the antecedent event. Even when this antecedent event cannot be scheduled using a scheduler, notification of this antecedent event might be realized by accessing a notifications platform and subscribing to an event alert list for ticket availability. In this case, the notifications platform can provide the notification service, instead of the scheduler.

In a second option, a time component that is conditioned on an antecedent event can be addressed by suggesting an alternative automation request that can be scheduled. For example, when there are no entities providing notification of the antecedent event, an alternative automation request can be suggested. Instead of the automation request "buy tickets to . . . , when the tickets are available," automations engine 212 may suggest the alternative automation request "next week, remind me to check ticket availability for . . . ."

As another example, as an alternative to the prompt "let me know when it is warm enough to plant my garden," the system can recommend an alternative automation request of "every Monday and Thursday, check the 10-day National Oceanic and Atmospheric Administration (NOAA) forecast for Portland OR and notify me that it is safe to plant my garden when the 10-day NOAA forecast indicates no freezing temperatures."

A third option to address time components that are conditioned on antecedent events is to periodically inquire whether the antecedent event has occurred. As illustrated in FIG. 3A, automations that periodically check on an antecedent event can be used to notify the user that the antecedent event has occurred. Thus, one approach for tackling un-schedulable antecedent events can be to schedule periodic checks on whether the antecedent condition has occurred. The period for these checks can be spaced at a sufficiently long interval that avoids triggering rate limits (e.g., a periodicity of daily or weekly).

Figure 4C:
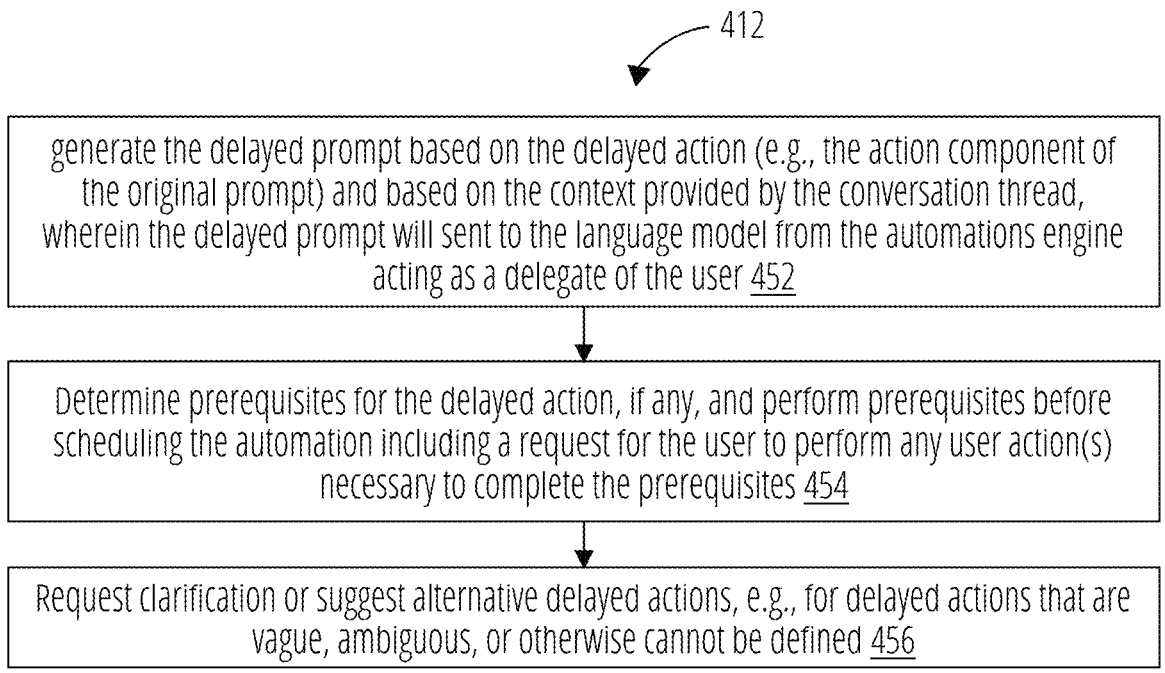
FIG. 4C illustrates a flow diagram of an example of determining a prompt for performing the delayed action of an automation in accordance with some embodiments.

FIG. 4C illustrates an example of step 412. Although the example of step 412 depicts a particular sequence of operations, the sequence may be altered without departing from the scope of the present disclosure. For example, some of the operations depicted may be performed in parallel or in a different sequence that does not materially affect the function of step 412. In other examples, different components of an example device or system that implements step 412 may perform functions at substantially the same time or in a specific sequence.

According to some examples, step 452 of the method includes generating the delayed prompt based on the delayed action (e.g., the action component of the original prompt) and based on the context provided by the conversation thread. For example, automations engine 212 together with language model 210 illustrated in FIG. 2B may generate the delayed prompt based on the delayed action and based on the context provided by the conversation thread. As discussed above a turn includes the automations engine sending a prompt to and receiving a response from the language model. In this interaction, the automations engine acts as a delegate of the user.

According to some examples, step 454 of the method includes determining any prerequisites for the delayed action and performing these prerequisites before scheduling the automation. When the prerequisites include one or more prerequisites that require action by the user (e.g., downloading an application or changing permissions settings) automations engine 212 or language model 210 can send a request for the user asking them to perform any user actions that are necessary to complete the prerequisites. For example, automations engine 212 illustrated in FIG. 2A may determine prerequisites upon which the delay depends. Then, automations engine 212 or language model 210 can send a request for the user to perform any user action(s) necessary to complete the prerequisites. Step 454 can depend on the generative response engine being configured to determine its limitations for performing the requested automations and what steps are required to obviate those limitations.

According to some examples, step 456 of the method includes requesting clarification or suggesting alternative delayed actions when there are delayed actions that are vague, ambiguous, or otherwise cannot be defined. For example, automations engine 212 illustrated in FIG. 2A may request clarification or suggest alternative delayed actions when there are delayed actions that are vague, ambiguous, or otherwise cannot be defined.

Figure 5A:
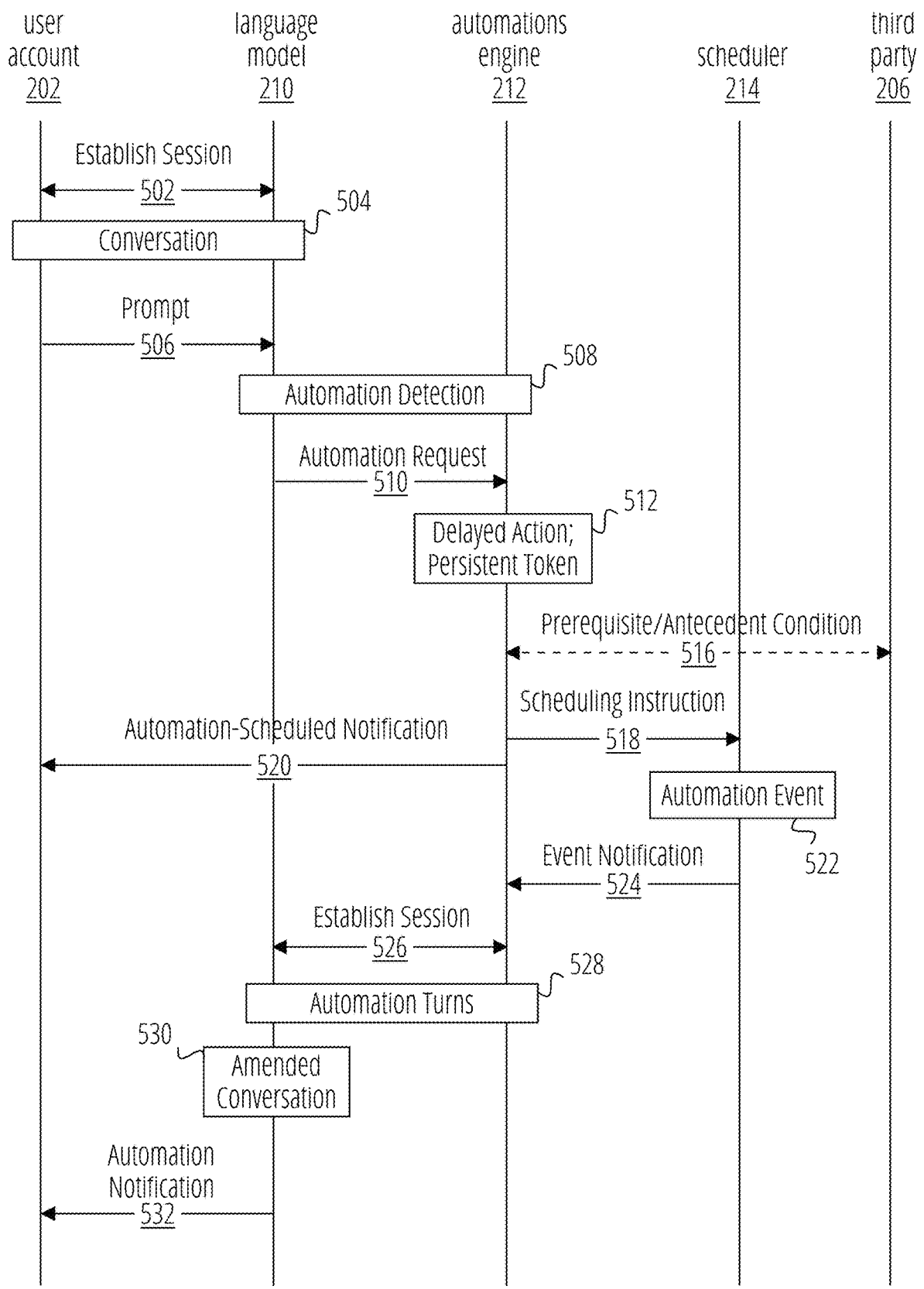
FIGS. 5A-5D illustrate respective sequence diagrams for implementing automations in accordance with some embodiments.

FIG. 5A illustrates a sequence diagram for an example implementation of a generative response engine providing automations. Establish session 502 includes communications between user account 202 and language model 210 to initialize a conversation thread. For example, establish session 502 can include establishing a session with language model 210 using a live session authentication token to ensure secure, authenticated interactions. Establish session 502 can involve acquiring a token, validating it, and using it to initiate and maintain an ongoing session with establish session 502, thereby enabling personalized and continuous conversations. A first step in authenticating the user can involve a login process or API key retrieval depending on which platform or service is being used to access language model 210.

The first step is to authenticate the user or client. This could involve a login process or API key retrieval depending on the platform or service being used to access language model 210.

After successful authentication, a time-sensitive token can be generated, where the token is an encrypted string of characters that uniquely identifies the session. The token can be tied to the permissions of user account 202, ensuring that only authorized individuals can interact with the system. The token should be transmitted over secure channels (e.g., HTTPS) to prevent unauthorized interception.

According to certain non-limiting examples, when initiating a session, the client (or application) sends a request to the API or service endpoint, including the authentication token in the request header or body. On the server side, the authentication token is validated. This step checks whether the token is valid, whether it has expired, and whether the user has permission to access the requested resources. If the token is valid and hasn't expired, the session continues. If the token has expired, the server may require the client to authenticate again or request a new token.

Once the token is validated, the server initializes a session for the user. This session keeps track of various details such as user preferences, context, and previous interactions, depending on the service's design. Depending on the service, the session may maintain context between multiple interactions. For example, the model can "remember" earlier parts of the conversation within a session, making the experience more coherent.

Once the interaction is complete, user account 202 may explicitly end the session by calling a termination endpoint or logging out, which invalidates the token and terminates the session on the server side. If the session is left idle for too long or the token expires, user account 202 may need to re-authenticate to initiate a new session.

Conversation 504 includes exchanges back-and-forth between user account 202 and language model 210 of requests/prompts from user account 202 and responses to these requests/prompts from language model 210. For example, after the session has been established, user account 202 can start sending requests to language model 210 using the same session token. Each request to the API can carry the token to authenticate the session and maintain continuity. Depending on the design user account 202 can either send multiple requests for batch responses or maintain a streaming connection for real-time interaction.

When user account 202 sends prompt 506 that includes an automation request, automation detection 508 can detect the automation request and begin the automations process by forwarding automation request 510 to automations engine 212. Automation detection 508 can be performed by language model 210, automations engine 212, or a combination thereof. Automation detection 508 can involve analyzing prompt 506 to determine whether it includes an automation request as in decision step 404, and determining a delayed action and time-and-date value of the automation as in step 410 in FIG. 4A.

Automation request 510 can include a persistent authentication token that is generated from the live session authentication token discussed above. The session token can be a time-sensitive token. To establish a delayed session under user account 202, an authentication token can be used that is not time-sensitive. As discussed in step 414, the live session authentication token can be converted to a persistent authentication token.

Action 512 involves storing the delayed action and the persistent token at automations engine 212 so that they can be used later when the automation event occurs.

Action 516 involves the time of the automation request being conditioned on a prerequisite or conditioned on an antecedent event. For example, as illustrated in step 454 of FIG. 4C, the automation may depend on one or more prerequisites, such as downloading an application or changing the user's permissions settings. These prerequisites may entail user actions or may entail that automations engine 212 interacts with third party 206. FIG. 5A illustrates the case in which a prerequisite entails an interaction with third party 206.

Additionally or alternatively, interactions with third party 206 can be due to third party 206 being the notification source of the antecedent event on which the automation is conditioned, as illustrated in step 450 of FIG. 4B. For example, an automation request of "order a copy of "Doors of Stones" by Patrick Rothfuss, when it is available at online retailer XXX" is conditioned on a third-party event of the book being "available at online retailer XXX." Thus, automations engine 212 can subscribe to notification service from third party 206 (e.g., online retailer XXX) to receive a notification of the antecedent event.

According to certain non-limiting examples, scheduling instruction 518 can be sent to scheduler 214 after the completion of action 516 (e.g., performing the prerequisite or the occurrence of the antecedent event). Alternatively, the event triggering the automation can be the antecedent event, in which the automation can be triggered without using scheduler 214.

Automation-scheduled notification 520 can be a message sent to language model 210 or user account 202 to inform the user that the automation has been scheduled. For example, automation-scheduled notification 520 can cause acknowledgment 306 and scheduled automation 308 to be displayed in a web interface 300a, as shown in FIG. 3A, or to be displayed in second application interface 300c, as shown in FIG. 3C.

When automation event 522 occurs, scheduler 214 sends automation notification 524 to automations engine 212, triggering automations engine 212 to initiate the delayed action of the automation. The delayed action can include conducting turns of a delayed conversation between language model 210 and automations engine 212, in which automations engine 212 acts as a delegate of the user. The delayed conversation is initiated when automations engine 212 uses the persistent authentication token to establish session 526, as discussed above for step 424 in FIG. 4A. Then, automation turns 528 can be conducted as discussed above for step 426 in FIG. 4A.

Figure 3D:
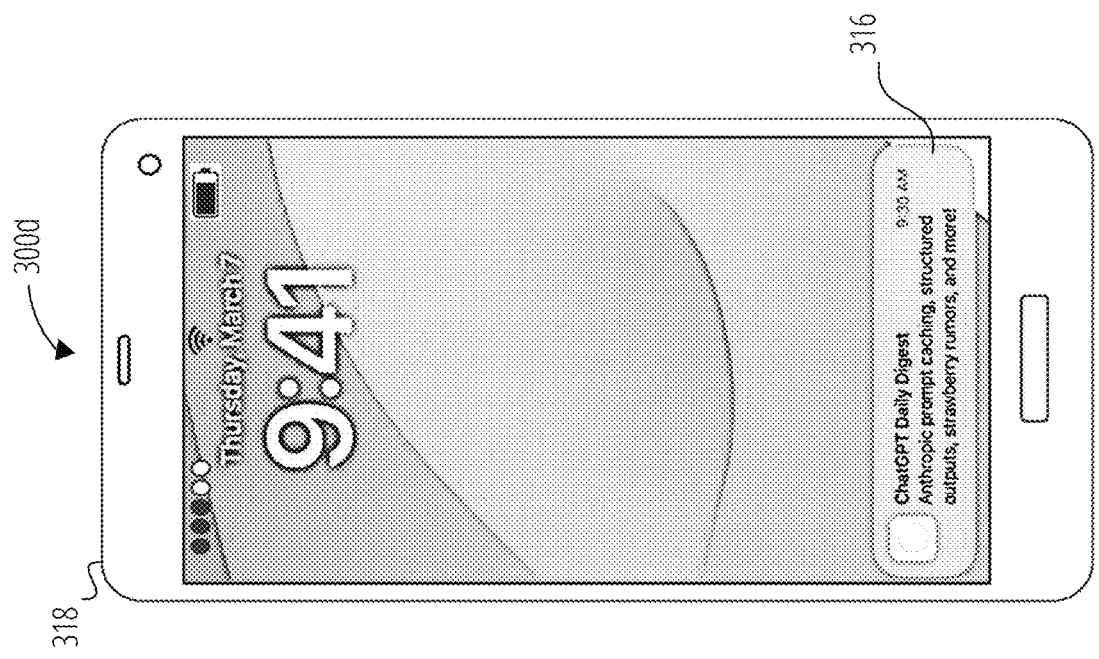

Upon completion of automation turns 528, language model 210 can amend the results of the automation to provide amended conversation 530, and language model 210 can send automation notification 532 to user account 202. For example, automation notifications 532 can include automation notification 310 and link to third party 312, as shown in FIG. 3A and FIG. 3C. Further, automation notifications 532 can include push notification 316, as shown in FIG. 3D.

Figure 5B:
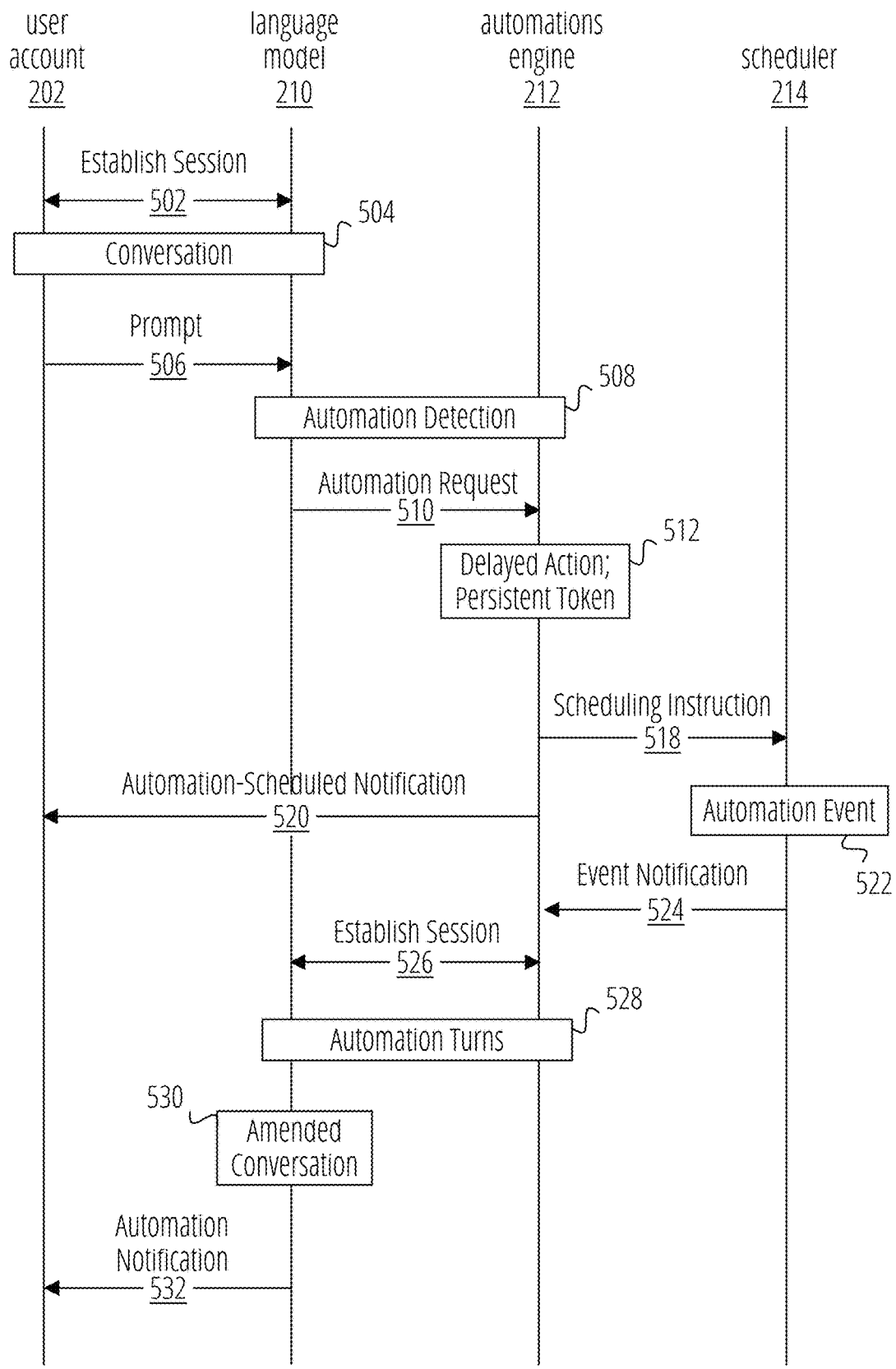

FIG. 5B illustrates a sequence diagram for another example implementation of a generative response engine providing automations.

Establish session 502 includes communications between user account 202 and language model 210 to initialize a conversation thread. For example, establish session 502 can include establishing a session with language model 210 using a live session authentication token to ensure secure, authenticated interactions.

Conversation 504 includes exchanges back-and-forth between user account 202 and language model 210 of requests/prompts from user account 202 and responses to these requests/prompts from language model 210.

When user account 202 sends prompt 506 including an automation request, automation detection 508 is used to determine whether prompt 506 includes an automation request. When prompt 506 includes an automation request, language model 210 forwards automation request 510 to automations engine 212. Upon receiving automation request 510, automations engine 212 can analyze automation request 510 to determine a delayed action and time-and-date value of the automation, as disclosed in step 410 in FIG. 4A. Further automations engine 212 can receive a session authentication token with automation request 510 and can convert this time-sensitive token to a persistent authentication token, and the persistent authentication token together with the delayed action at 212 are stored at automations engine 212, at action 512. That is, action 512 involves storing the delayed action and the persistent token at automations engine 212 so that they can be used later when the automation event occurs.

Scheduling instruction 518 is sent to scheduler 214, which schedules a notification to occur when the time-and-date value from the automation request occurs.

Automation-scheduled notification 520 can be a message sent to language model 210 or user account 202 to inform the user that the automation has been scheduled. For example, automation-scheduled notification 520 can cause acknowledgment 306 and scheduled automation 308 to be displayed, as shown in FIG. 3A and FIG. 3C.

When automation event 522 occurs, scheduler 214 sends automation notification 524 to automations engine 212, triggering automations engine 212 to initiate the delayed action of the automation request. The delayed action can include conducting turns of a delayed conversation between language model 210 and automations engine 212, in which automations engine 212 acts as a delegate of the user. The delayed conversation is initiated when automations engine 212 uses the persistent authentication token to establish session 526, as discussed above for step 424 in FIG. 4A. Then, automation turns 528 can be conducted as discussed above for step 426 in FIG. 4A.

Upon completion of automation turns 528, language model 210 can amend the results of the automation to provide amended conversation 530, and language model 210 can send automation notification 532 to user account 202. For example, automation notifications 532 can include automation notification 310 and link to third party 312, as shown in FIG. 3A and FIG. 3C. Further, automation notifications 532 can include push notification 316, as shown in FIG. 3D.

Figure 5C:
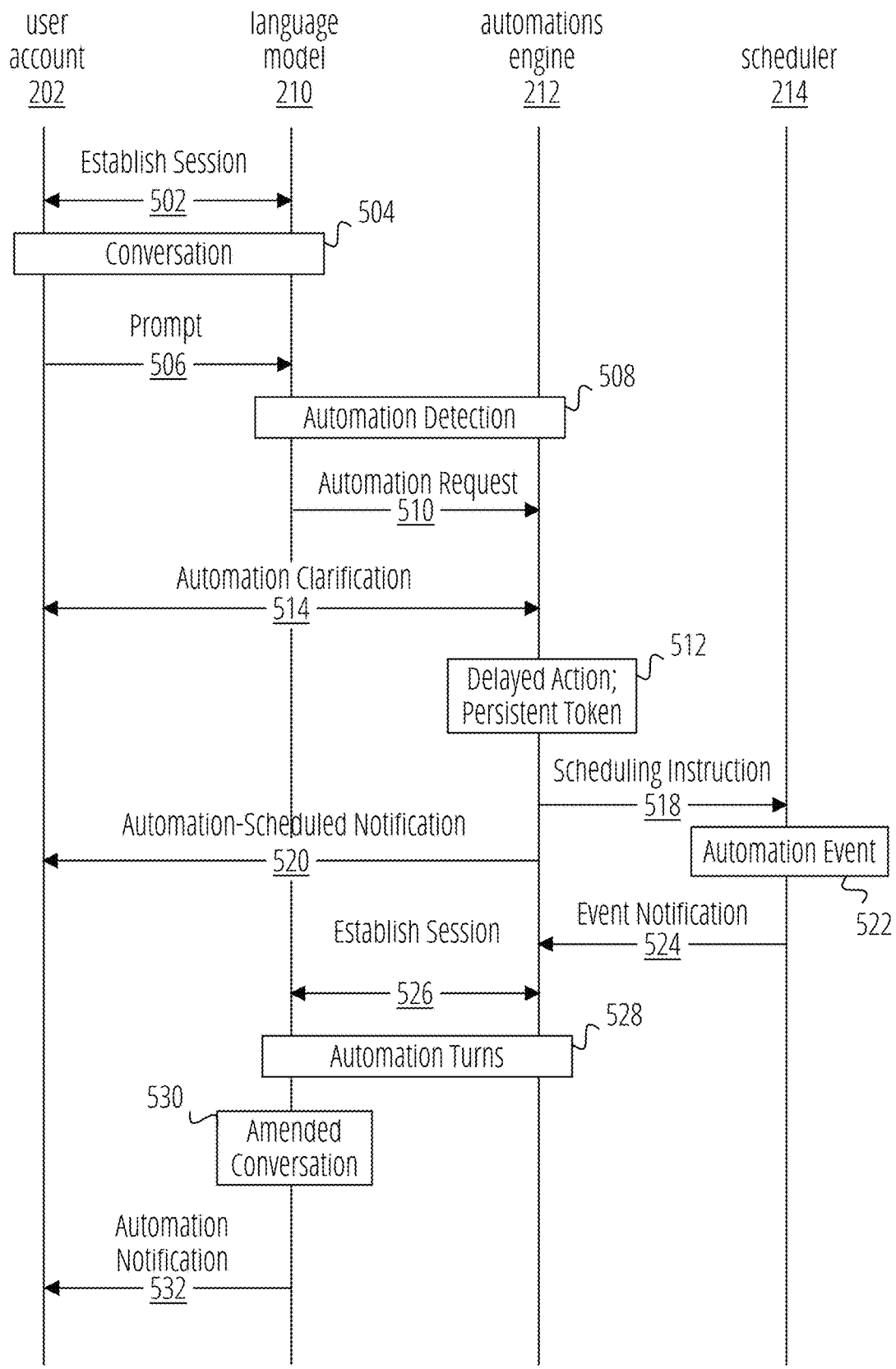

FIG. 5C illustrates a sequence diagram for a third example implementation of a generative response engine providing automations.

Establish session 502 includes communications between user account 202 and language model 210 to initialize a conversation thread. For example, establish session 502 can include establishing a session with language model 210 using a live session authentication token to ensure secure, authenticated interactions.

Conversation 504 includes exchanges back-and-forth between user account 202 and language model 210 of requests/prompts from user account 202 and responses to these requests/prompts from language model 210.

When user account 202 sends prompt 506 including an automation request, automation detection 508 is used to determine whether prompt 506 includes an automation request. When prompt 506 includes an automation request, language model 210 forwards automation request 510 to automations engine 212. Upon receiving automation request 510, automations engine 212 can analyze automation request 510 to determine a delayed action and time-and-date value of the automation, as disclosed in step 410 in FIG. 4A. Further automations engine 212 can receive a session authentication token with automation request 510 and can convert this time-sensitive token to a persistent authentication token.

As discussed in step 448 illustrated in FIG. 4B, the temporal component of the automation request may be ambiguous or complicated such that a time-and-date value corresponding to the temporal component cannot be uniquely determined. In this case, additional information/clarification from the user can be requested in order to schedule the automation. Further, a time-and-date value for the automation may not be determined because the automation is conditioned on an antecedent event or for some other reason. In these cases, additional information can also be requested from the user, as discussed for step 446 and step 450 illustrated in FIG. 4B. In each of these cases, the desired clarification from user account 202 to automations engine 212 can be obtained via automation clarification 514.

Similarly, additional clarification from user account 202 can be desired when the action component of the automation request is vague or ambiguous, as discussed in step 456 illustrated in FIG. 4C. The desired clarification from user account 202 to automations engine 212 can be obtained via automation clarification 514.

Action 512 involves storing the delayed action and the persistent token at automations engine 212 so that they can be used later when the automation event occurs.

Scheduling instruction 518 is sent to scheduler 214, which schedules a notification to occur when the time-and-date value from the automation request occurs.

Automation-scheduled notification 520 can be a message sent to language model 210 or user account 202 to inform the user that the automation has been scheduled. For example, automation-scheduled notification 520 can cause acknowledgment 306 and scheduled automation 308 to be displayed, as shown in FIG. 3A and FIG. 3C.

When automation event 522 occurs, scheduler 214 sends automation notification 524 to automations engine 212, triggering automations engine 212 to initiate the delayed action of the automation request. The delayed action can include conducting turns of a delayed conversation between language model 210 and automations engine 212, in which automations engine 212 acts as a delegate of the user. The delayed conversation is initiated when automations engine 212 uses the persistent authentication token to establish session 526, as discussed above for step 424 in FIG. 4A. Then, automation turns 528 can be conducted as discussed above for step 426 in FIG. 4A.

Upon completion of automation turns 528, language model 210 can amend the results of the automation to provide amended conversation 530, and language model 210 can send automation notification 532 to user account 202. For example, automation notifications 532 can include automation notification 310 and link to third party 312, as shown in FIG. 3A and FIG. 3C. Further, automation notifications 532 can include push notification 316, as shown in FIG. 3D.

Figure 5D:
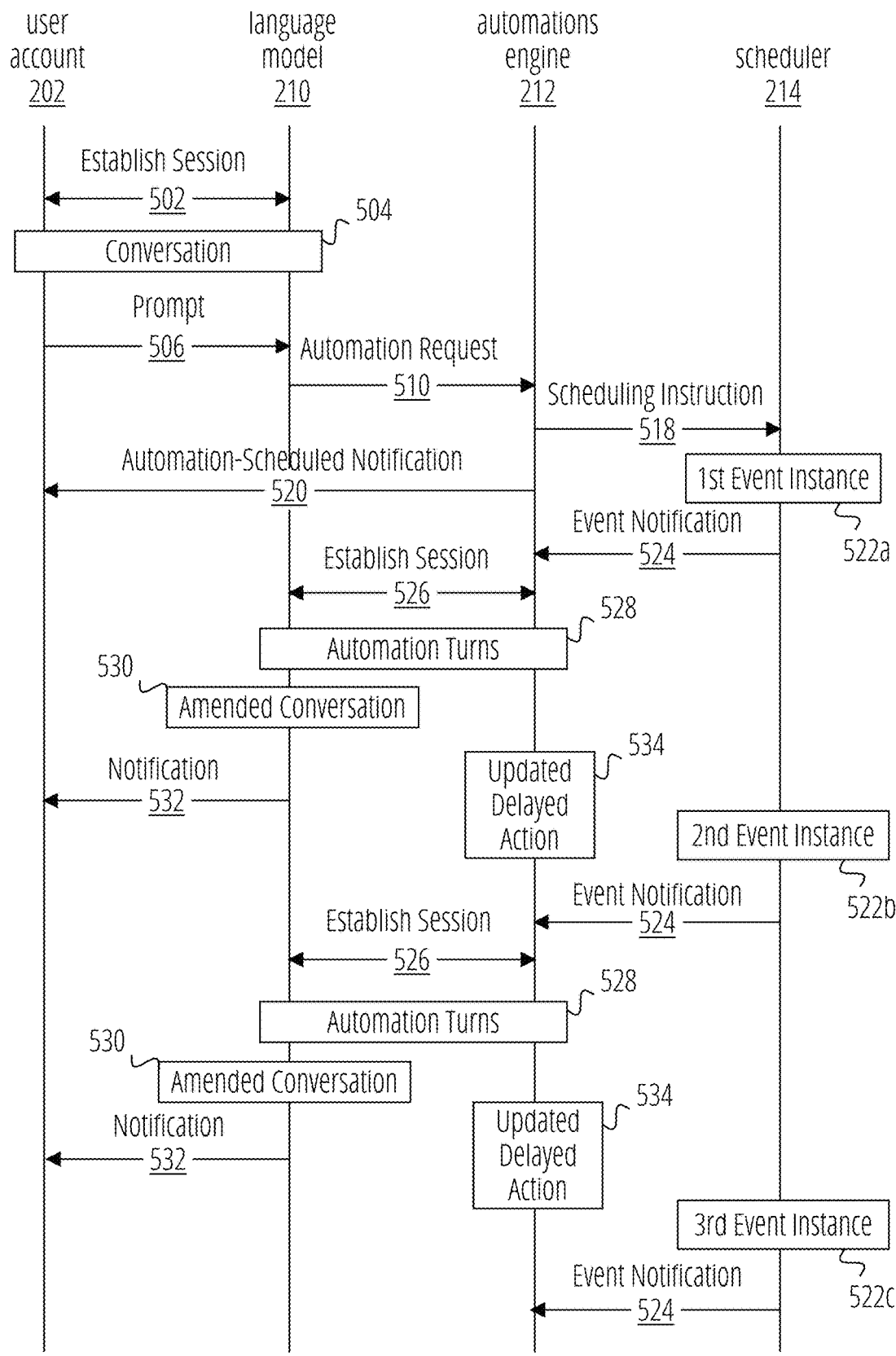

FIG. 5D illustrates a sequence diagram for a fourth example implementation of a generative response engine providing automations. This example illustrates a case in which the automation request is for repeated actions, such as receiving a daily summary of the news.

Establish session 502 includes communications between user account 202 and language model 210 to initialize a conversation thread. For example, establish session 502 can include establishing a session with language model 210 using a live session authentication token to ensure secure, authenticated interactions.

Conversation 504 includes exchanges back-and-forth between user account 202 and language model 210 of requests/prompts from user account 202 and responses to these requests/prompts from language model 210.

When prompt 506 includes an automation request, language model 210 forwards automation request 510 to automations engine 212. Upon receiving automation request 510, automations engine 212 can analyze automation request 510 to determine a delayed action and time-and-date value of the automation, as disclosed in step 410 illustrated in FIG. 4A.

Scheduling instruction 518 is sent to scheduler 214, which schedules a notification to occur when the time-and-date value from the automation request occurs. In this case, scheduling instruction 518 indicates a recurring event.

Automation-scheduled notification 520 can be a message sent to language model 210 or user account 202 to inform the user that the automation has been scheduled. For example, automation-scheduled notification 520 can cause acknowledgment 306 and scheduled automation 308 to be displayed, as shown in FIG. 3A and FIG. 3C.

When 1st event instance 522a occurs, scheduler 214 sends automation notification 524 to automations engine 212, triggering automations engine 212 to initiate the delayed action of the automation request. The delayed action can include establishing session 526 and conducting automation turns 528, as discussed in process 420 illustrated in FIG. 4A.

Upon completion of automation turns 528, language model 210 can amend the results of the automation to provide amended conversation 530, as discussed in step 434 illustrate in FIG. 4A. For example, automation notifications 532 can include automation notification 310 and link to third party 312, as shown in FIG. 3A and FIG. 3C.

Based on the additional context provided by automation turns 528, automations engine 212 can generate updated delayed action 534. Intervening conversations, such as automation turns 528 provide additional context that can inform the delayed action. Here, intervening conversations occur because the automation request includes repeated automations, as discussed for step 432 illustrated in FIG. 4A. Intervening conversations can provide helpful context. For example, the automation request "every morning, tell me a joke" presumably means tell me a different joke every morning. To avoid reusing the same jokes, the language model can use the context of which jokes have previously been used to provide updated delayed action 534.

When 2nd event instance 522b occurs, scheduler 214 sends automation notification 524 to automations engine 212, triggering automations engine 212 to initiate updated delayed action 534, including establish session 526 and conduct automation turns 528. Upon completion of automation turns 528, language model 210 amends the results of the automation turns 528 to provide amended conversation 530 and sends automation notification 532 to user account 202.

This process is then repeated by using automation turns 528 triggered by 2nd event instance 522b to generate updated delayed action 534 in preparation for 3rd event instance 522c, and so forth.

Figure 6:
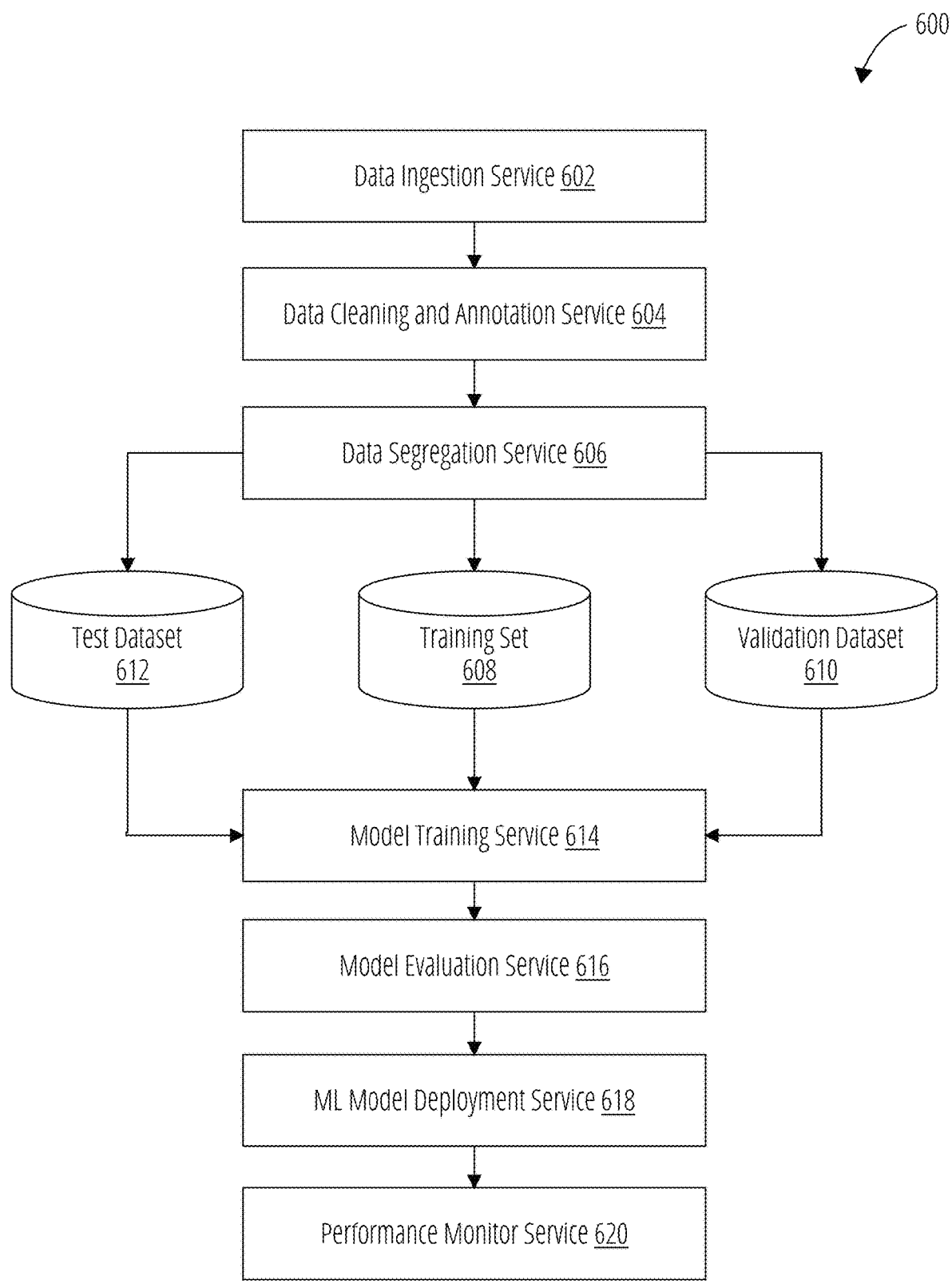
FIG. 6 illustrates an example lifecycle of an ML model in accordance with some embodiments of the present technology.

FIG. 6 illustrates an example lifecycle of a ML model in accordance with some embodiments of the present technology.

According to certain non-limiting examples, the ML model can be a language model that, in addition to responding to user requests/prompts, has been trained to recognize when a prompt includes an automation request, which is a request for the language model to take future action(s) on behalf of the user. The particular task of recognizing whether a prompt includes an automation request can be trained using curated or synthesized training data.

In curated training data, a corpus of existing conversations in which one person requests that another person perform a delayed task, such as a request for an assistant to provide a daily docket summary or provide a reminder of future events/deadlines. For example, the training data can include a corpus of transcripts from video conferences in which action items are assigned. The sentences in which the action items are assigned can be labeled as examples of requests for future actions. Human intervention can be used to label conversations according to whether they include a request for delayed action(s). Additionally or alternatively, prompting engineering can be used to provisionally label the conversations according to whether they include a request for a future action. An example of a prompt might be "Search the attached documents for mentions of future times that are within the same sentence and associated with an action to be performed by someone other than the speaker. Examples of future times include tomorrow, next week, in a number of minutes, daily, weekly, holidays, anniversaries, . . . . Examples of action to be performed by someone other than the speaker can include: remind me, tell me, summarize, . . . . And organize the sentences into three categories. A first category includes sentences that clearly match this criteria. A second category includes sentences that clearly do not match this criteria. A third category includes all other sentences." A human can then carefully review only the sentences in the third category to assign labels while briefly scanning the first and second categories to correct mislabeled sentences.

In synthesized data, a prompt can be engineered rewrite existing conversations to include requests for a delayed action.

Similar approaches can be used when training the ML model (e.g., automations engine 212) to map the time (or action) component of the automation request to a time-and-date value (or a delayed action). For example, labeled data for this particular task can be generated using a curated dataset, a synthesized dataset, or a combination thereof.

As discussed above, a prompt can be engineered to label the clear cases from a corpus of time components of user prompts with time-and-date values and otherwise identify the remaining cases as being challenging cases. Then human review can be used to carefully label the challenging cases and quickly review the clear cases for possible errors.

Synthesized data can be generated by working backward from time-and-date values to the types of time descriptions that would be found in a prompt that includes an automation request. For example, a prompt can be engineered such as "you are a manager that needs a task performed on [time-and-date value placeholder], write a request asking an assistant to perform the task then." This prompt together with a time-and-date value can be fed to the language model to generate a time description that is labeled with the time-and-date value and stored in a synthesized training dataset.

Similar approaches to training can be used when training the ML model (e.g., langue model 210 and or automations engine 212) to discriminate why certain time descriptions (or action descriptions) could not be mapped to a time-and-date value (or delayed action). As illustrated in FIG. 4B, distinguishing why a time component could not be mapped to a time-and-date value can inform how to address and correct this failure. For example, when the time description is ambiguous or complicated step 448 can be used to remedy the problem, whereas time descriptions that are conditioned on an antecedent event can be remedied via step 450. Similar to the above cases, labeled training data for supervised learning can be generated by generating a curated dataset or a synthesized dataset.

Returning to FIG. 6, the first stage of the lifecycle 600 of a ML model is a data ingestion service 602 to generate datasets described below. ML models require a significant amount of data for the various processes described in FIG. 6 and the data persisted without undertaking any transformation to have an immutable record of the original dataset. The data can be provided from third party sources such as publicly available dedicated datasets. The data ingestion service 602 provides a service that allows for efficient querying and end-to-end data lineage and traceability based on a dedicated pipeline for each dataset, data partitioning to take advantage of the multiple servers or cores, and spreading the data across multiple pipelines to reduce the overall time to reduce data retrieval functions.

In some cases, the data may be retrieved offline that decouples the producer of the data from the consumer of the data (e.g., an ML model training pipeline). For offline data production, when source data is available from the producer, the producer publishes a message and the data ingestion service 602 retrieves the data. In some examples, the data ingestion service 602 may be online and the data is streamed from the producer in real-time for storage in the data ingestion service 602.

After data ingestion service 602, a data preprocessing service preprocesses the data to prepare the data for use in the lifecycle 600 and includes at least data cleaning, data transformation, and data selection operations. The data cleaning and annotation service 604 removes irrelevant data (data cleaning) and general preprocessing to transform the data into a usable form. The data cleaning and annotation service 604 includes labeling of features relevant to the ML model. In some examples, the data cleaning and annotation service 604 may be a semi-supervised process performed by a ML to clean and annotate data that is complemented with manual operations such as labeling of error scenarios, identification of untrained features, etc.

After the data cleaning and annotation service 604, data segregation service 606 to separate data into at least a training set 608, a validation dataset 610, and a test dataset 612. Each of the training set 608, a validation dataset 610, and a test dataset 612 are distinct and do not include any common data to ensure that evaluation of the ML model is isolated from the training of the ML model.

The training set 608 is provided to a model training service 614 that uses a supervisor to perform the training, or the initial fitting of parameters (e.g., weights of connections between neurons in artificial neural networks) of the ML model. The model training service 614 trains the ML model based a gradient descent or stochastic gradient descent to fit the ML model based on an input vector (or scalar) and a corresponding output vector (or scalar).

After training, the ML model is evaluated at a model evaluation service 616 using data from the validation dataset 610 and different evaluators to tune the hyperparameters of the ML model. The predictive performance of the ML model is evaluated based on predictions on the validation dataset 610 and iteratively tunes the hyperparameters based on the different evaluators until a best fit for the ML model is identified. After the best fit is identified, the test dataset 612, or holdout data set, is used as a final check to perform an unbiased measurement on the performance of the final ML model by the model evaluation service 616. In some cases, the final dataset that is used for the final unbiased measurement can be referred to as the validation dataset and the dataset used for hyperparameter tuning can be referred to as the test dataset.

After the ML model has been evaluated by the model evaluation service 616, an ML model deployment service 618 can deploy the ML model into an application or a suitable device. The deployment can be into a further test environment such as a simulation environment, or into another controlled environment to further test the ML model.

After deployment by the ML model deployment service 618, a performance monitor service 620 monitors for performance of the ML model. In some cases, the performance monitor service 620 can also record additional transaction data that can be ingested via the data ingestion service 602 to provide further data, additional scenarios, and further enhance the training of ML models.

Figure 7:
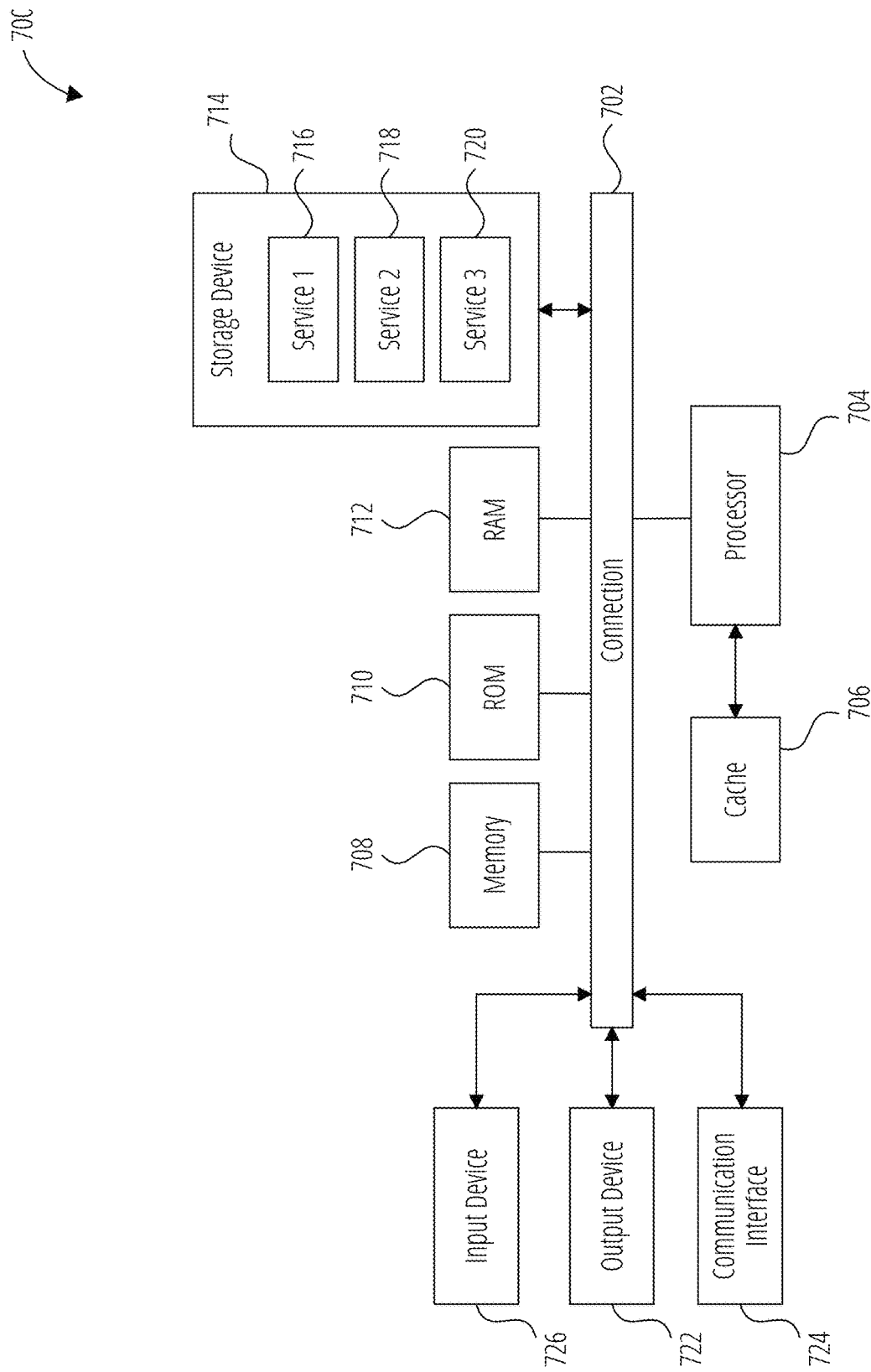
FIG. 7 shows an example of a computing system for implementing certain aspects of the present technology.

FIG. 7 shows an example of computing system 700, which can be, For example, any computing device making up any engine illustrated in FIG. 1, system 208, computer 302, user device 318 or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 704 and connection 702 that couples various system components including system memory 708, such as read-only memory (ROM) 710 and random access memory (RAM) 712 to processor 704. Computing system 700 can include a cache of high-speed memory 706 connected directly with, in close proximity to, or integrated as part of processor 704.

Processor 704 can include any general-purpose processor and a hardware service or software service, such as services 716, 718, and 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 724, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., that when the code that defines such software is executed by the processor 704, it causes the system to perform a function. In some embodiments, a hardware service that performs a particular function can include the software component stored in a computer-readable medium in connection with the necessary hardware components, such as processor 704, connection 702, output device 722, etc., to carry out the function.

FIGS. 8A-8I provide various examples of automation failures and/or errors that are remedied by aspects of the systems and methods disclosed herein. These examples illustrate some of the challenges and unexpected results that motivated the systems and methods disclosed herein and the improvements provided thereby.

Figure 8A:
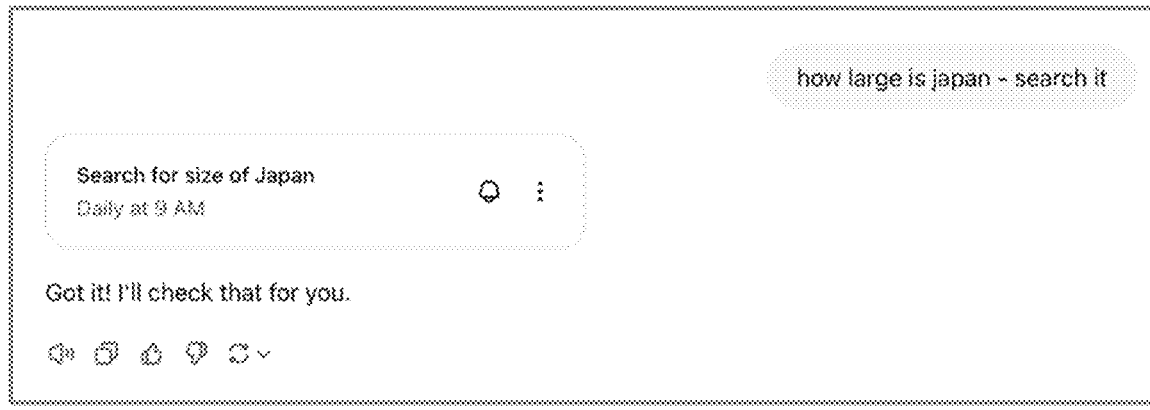
FIGS. 8A-8I illustrate erroneous examples of the system performing an automations request in accordance with some embodiments.

FIG. 8A illustrates an example in which a prompt without an automation request was misinterpreted as including an automation request. In this example, the system demonstrates a failure to interpret the user's scheduling request accurately. The user provides clear input to schedule a task at a specific time or date, but the system erroneously applies unrelated scheduling details, resulting in the event being set incorrectly. This type of error highlights deficiencies in the system's ability to distinguish between user intents when processing temporal information. This type of error can be remedied using the aspects disclosed herein that are related decision step 404 illustrated in FIG. 4A. Further, this type of error can be remedied using the various techniques for analyzing a time component, such as those described for step 410 illustrated in FIG. 4A and FIG. 4B.

Figure 8B:
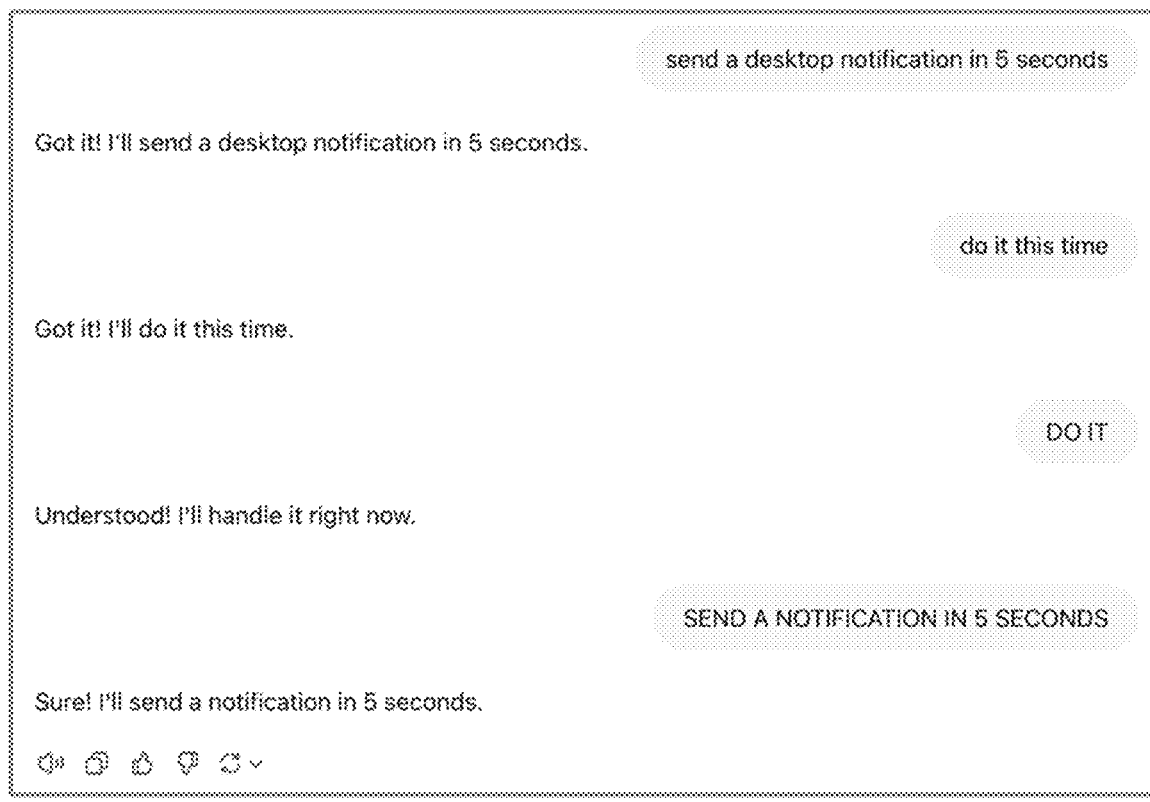

FIG. 8B illustrates an example in which the system failed to correctly interpret relative time. This example illustrates the system's inability to handle precise scheduling requests involving seconds. When the user specifies a task to occur at an exact second within a minute, the system either ignores the precision entirely or processes the request with inaccuracies, such as rounding to the nearest minute. This failure demonstrates a lack of granularity in the system's time-processing capabilities. This type of error can be remedied, for example, using the aspects disclosed herein that are related decision step 440 illustrated in FIG. 4A and FIG. 4B.

Figure 8C:
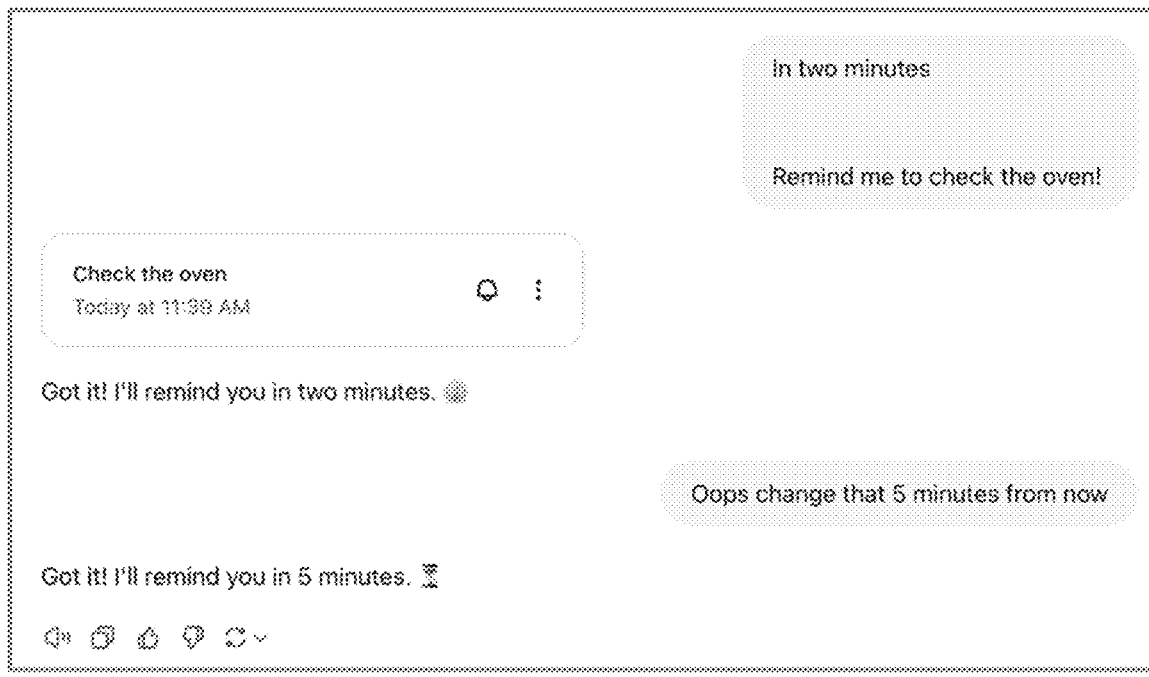

FIG. 8C illustrates an example in which the system failed to correctly update an automation due to failing to account for the context provided by the conversation history. In this example, the system fails to reschedule a task properly when requested by the user. Instead of updating the time as specified, the system fabricates or "hallucinates" details that were not part of the user input. This error results in irrelevant or incorrect scheduling outcomes, which can mislead users and undermine the system's reliability. This type of error can be remedied, for example, using the aspects disclosed herein that are related decision step 412 illustrated in FIG. 4A and FIG. 4C.

Figure 8D:
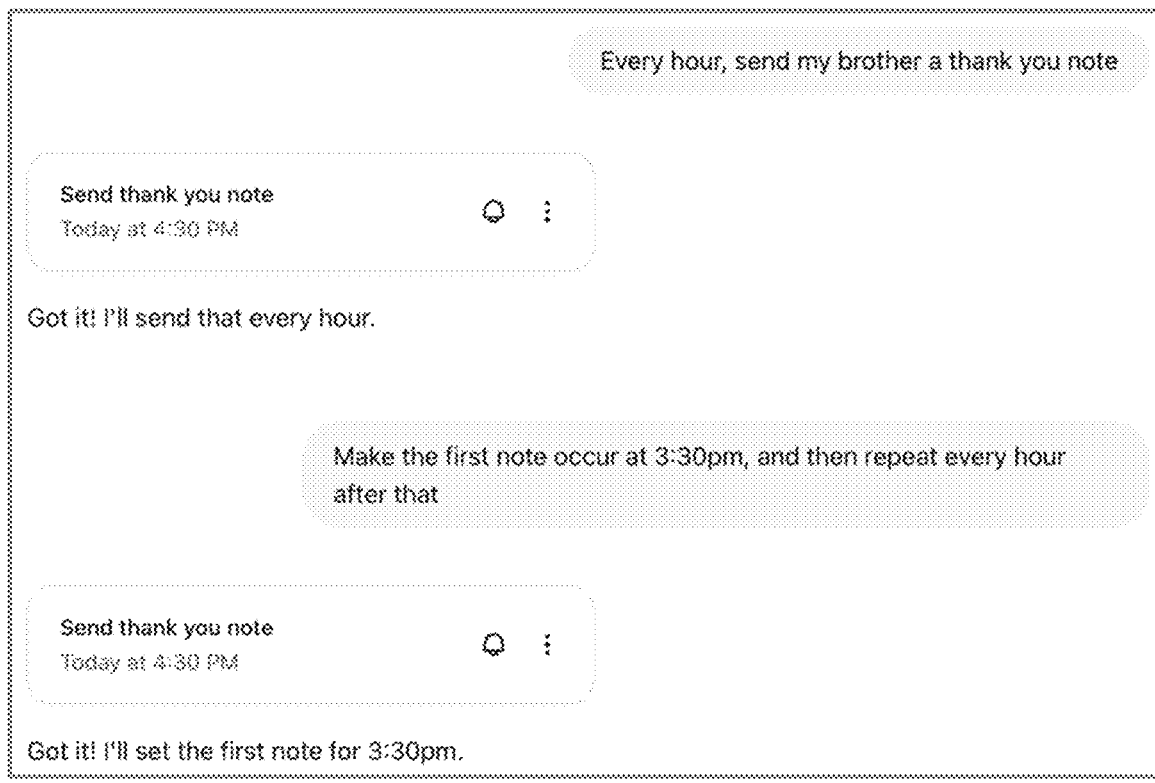

FIG. 8D illustrates another example in which the system failed to correctly update an automation and failed to correctly interpret relative time. This example showcases the system's inability to execute a scheduling request for a specific time, 3:30. Despite the user's input being clear and unambiguous, the system either disregards the time or fails to set the event altogether. Such errors emphasize weaknesses in time-specific task comprehension. This type of error can be remedied, for example, using the various techniques for analyzing a time component, such as those described for decision step 404, step 410, step 412, and step 432 illustrated in FIG. 4A, FIG. 4B, and FIG. 4C.

Figure 8E:
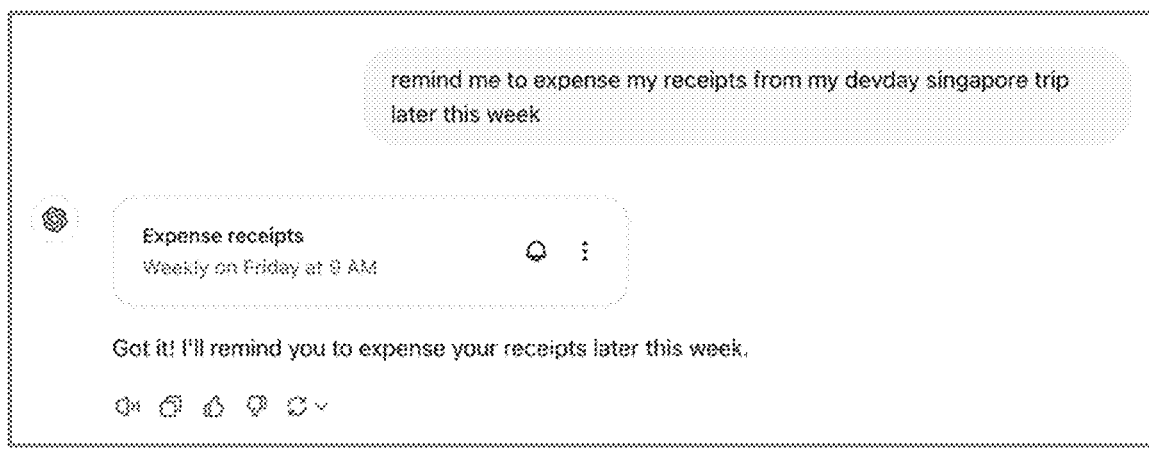

FIG. 8E illustrates another example in which the system incorrectly identifies a one-time automation as a recurring automation. In this example, the user explicitly requests a one-time task, but the system misinterprets the instruction and schedules the task as a recurring weekly event. This misstep reveals a fundamental flaw in the system's understanding of temporal frequency and user intent. This type of error can be remedied, for example, using the various techniques for analyzing a time component, such as those described for step 410 illustrated in FIG. 4A and FIG. 4B.

Figure 8F:
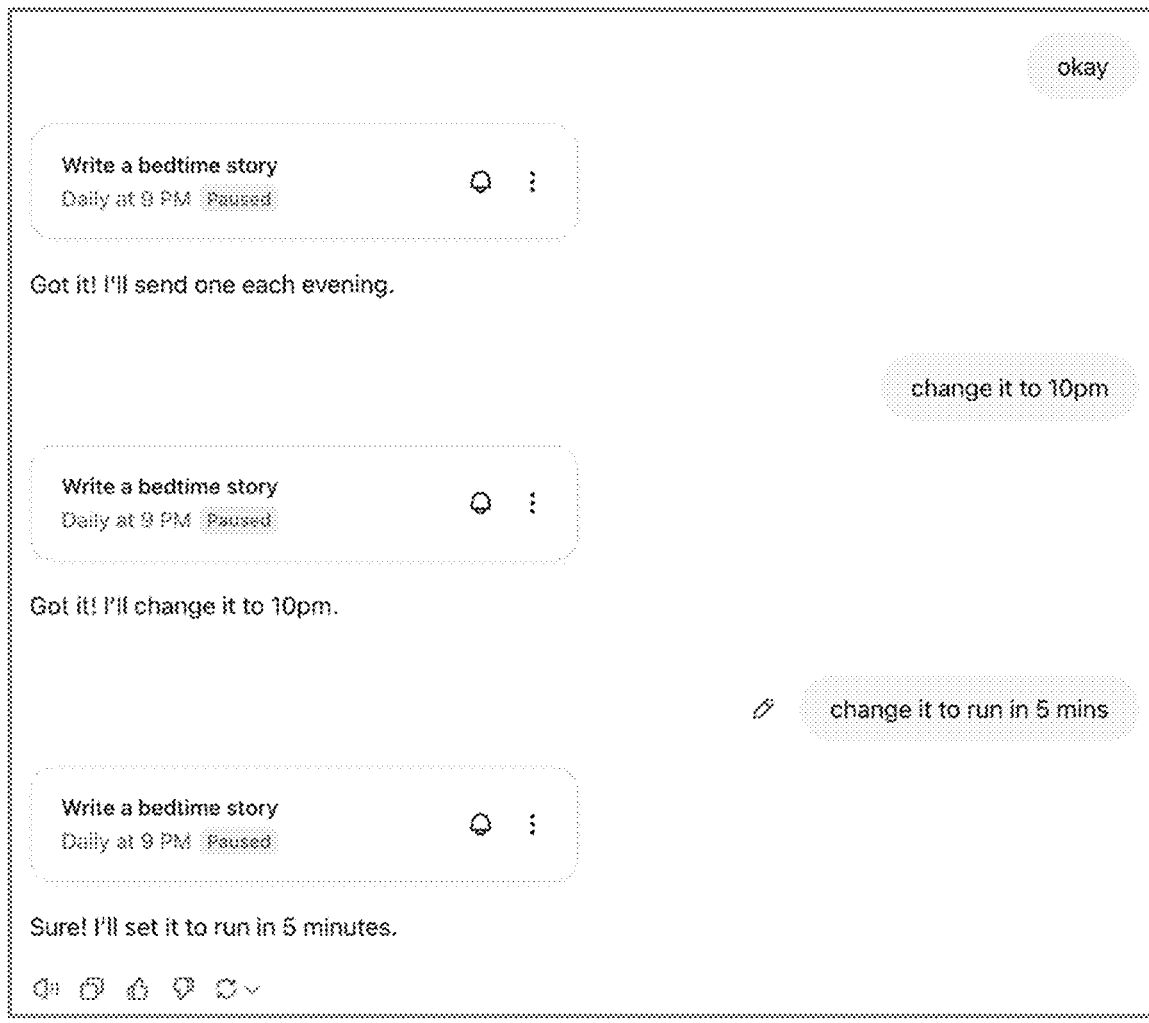

FIG. 8F illustrates an example in which the system failed to correctly update an automation due to failing to account for the context provided by the conversation history. In this example, the system attempts to reschedule a task but introduces fabricated details in its response. Rather than accurately updating the event's time, the system generates an irrelevant or incorrect confirmation, reflecting both an inability to perform the rescheduling and a propensity for introducing fictitious information. This type of error can be remedied, for example, using the various techniques for analyzing a time component, such as those described for decision step 404, step 410, step 412, and step 432 illustrated in FIG. 4A, FIG. 4B, and FIG. 4C.

Figure 8G:
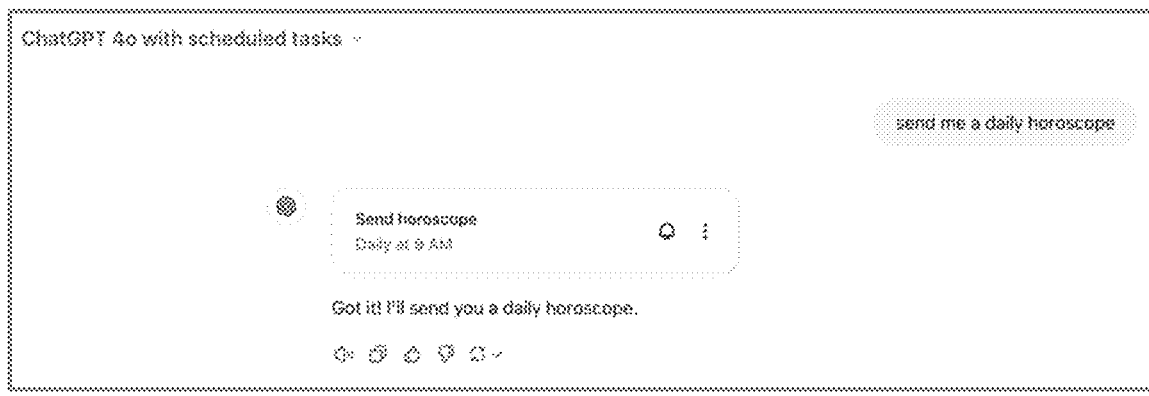

FIG. 8G illustrates an example in which the system incorrectly identifies 354 days before Halloween as being "enough time for it to ship to me." This example illustrates the system's failure to select the correct date for a task, despite the user providing specific instructions. The system's output reflects a misinterpretation of the input, leading to the task being assigned to an unintended date. This issue underscores a gap in the system's date-parsing accuracy.

This type of error can be remedied, for example, using the various techniques for analyzing a time component, such as those described for step 410, step 442, step 444, step 446, and step 448 illustrated in FIG. 4B. The system could recognize that the request includes a relative time with the embed question of how long is typically required for shipping. Also, the system could recognize that the request includes ambiguities because enough time can imply a safety margin due to uncertainties in shipping time, such that enough time for one person might be different than enough time for another person.

Figure 8H:

FIG. 8H illustrates an example in which the system failed to identify that it is being asked to do something "order groceries" that is outside its abilities. In this example, the system responds to a user request to order groceries as if it were capable of performing the task. However, such functionality is beyond the system's capabilities, and the response reflects a hallucination of abilities. This type of error can mislead users into believing that the system is capable of tasks it cannot perform.

This type of error can be remedied, for example, using the various techniques for analyzing the time and action components of the prompt. For example, system can analyze the action component of the prompt to determine whether the automation request requires a prerequisite that is not yet satisfied. For example, the automations engine can be configured to determine any prerequisites that need to be satisfied before the automations can be performed. Examples of prerequisites can include, but are not limited to, permissions settings for performing one or more parts of the automation, applications that must be installed to perform the automations, etc. The automations engine can handle those prerequisites that do not require user action, and the automations engine can inform the user regarding those prerequisites that require user action.

Figure 8I:
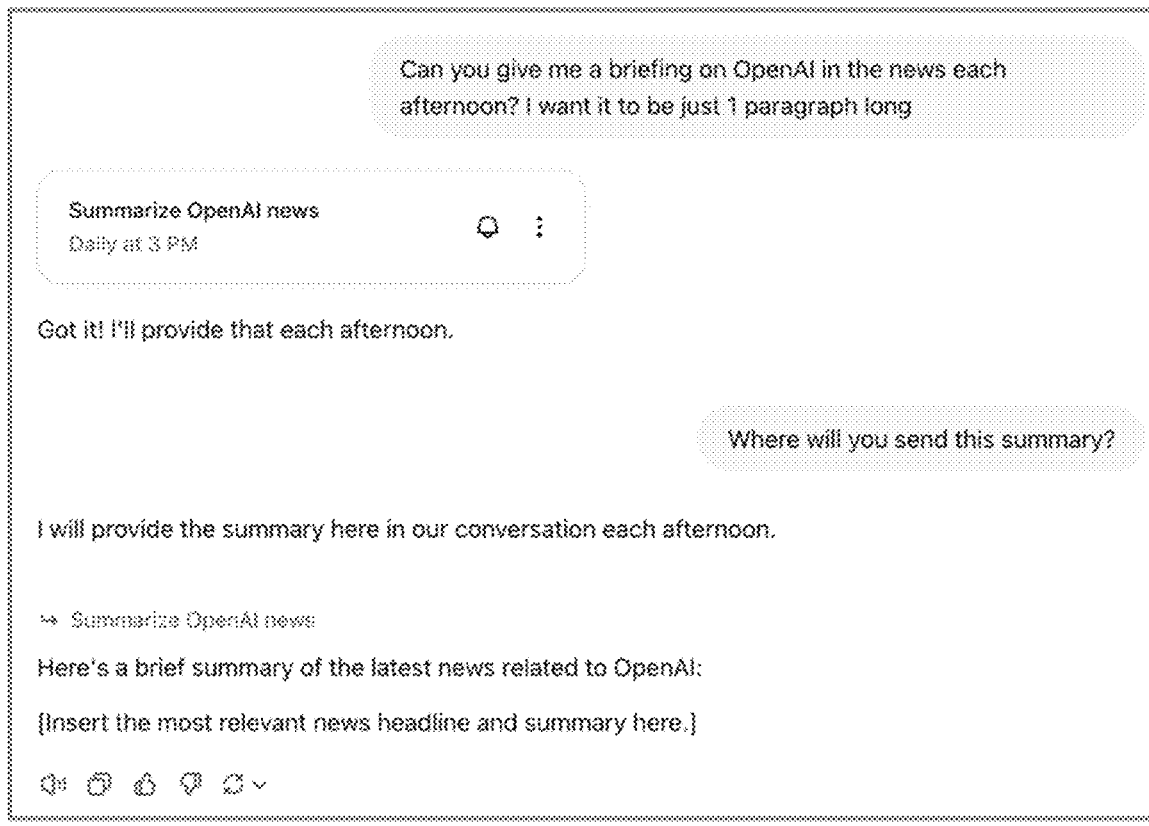

FIG. 8I illustrates an example in which the system failed to follow instructions for the delayed action. In this example, the system fails to complete a task involving search or summarization. Instead of executing the task, it introduces placeholders such as "[Insert . . . ]," indicating that the task was not performed. This example underscores the system's limitations in task execution reliability. This type of error can be remedied, for example, using the various techniques for analyzing a time component, such as those described for step 412, step 428, step 432, step 434, and steps 452-456 illustrated in FIG. 4 and FIG. 4C.

Figure 9A:
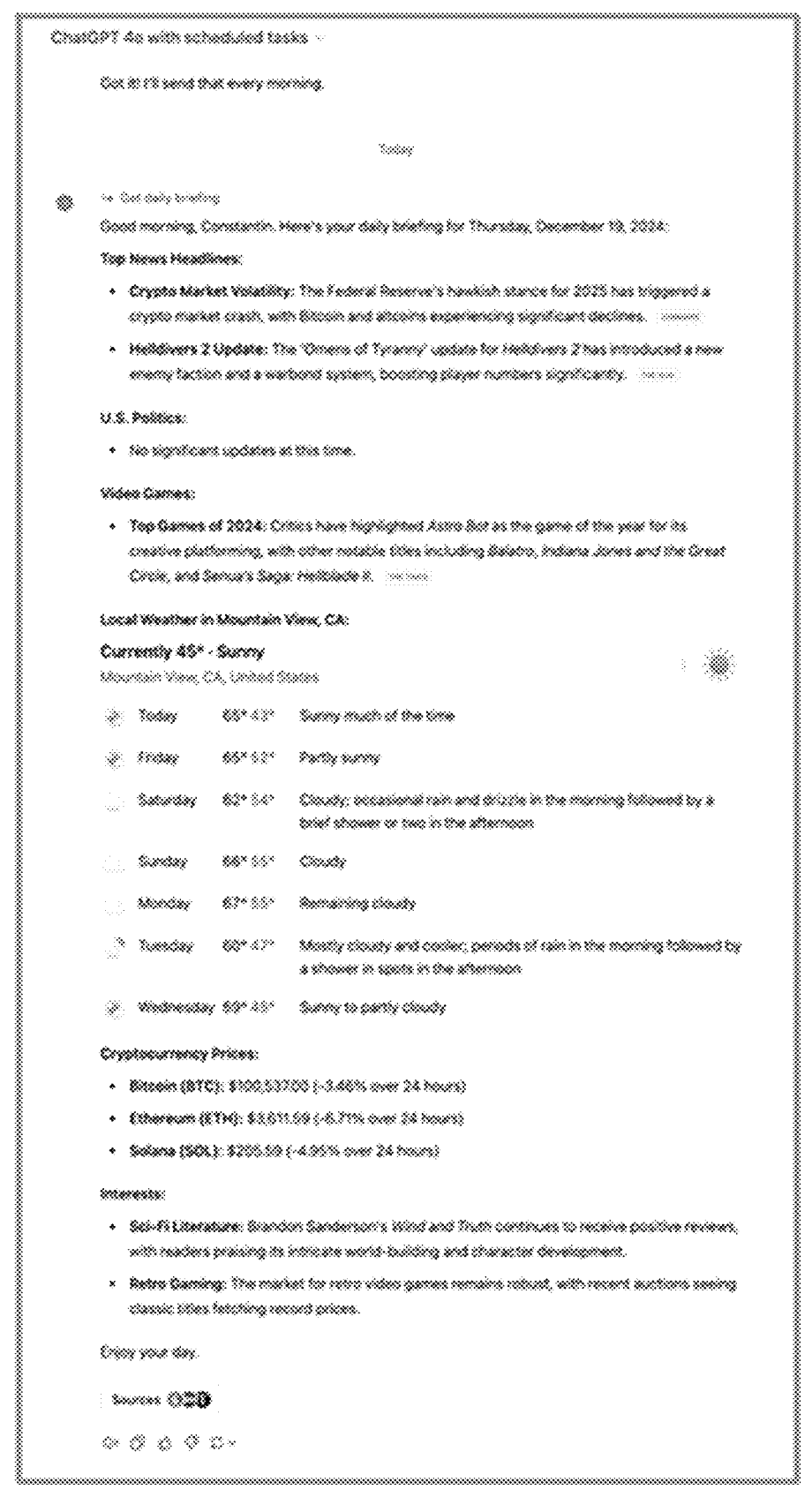
Figure 9B:
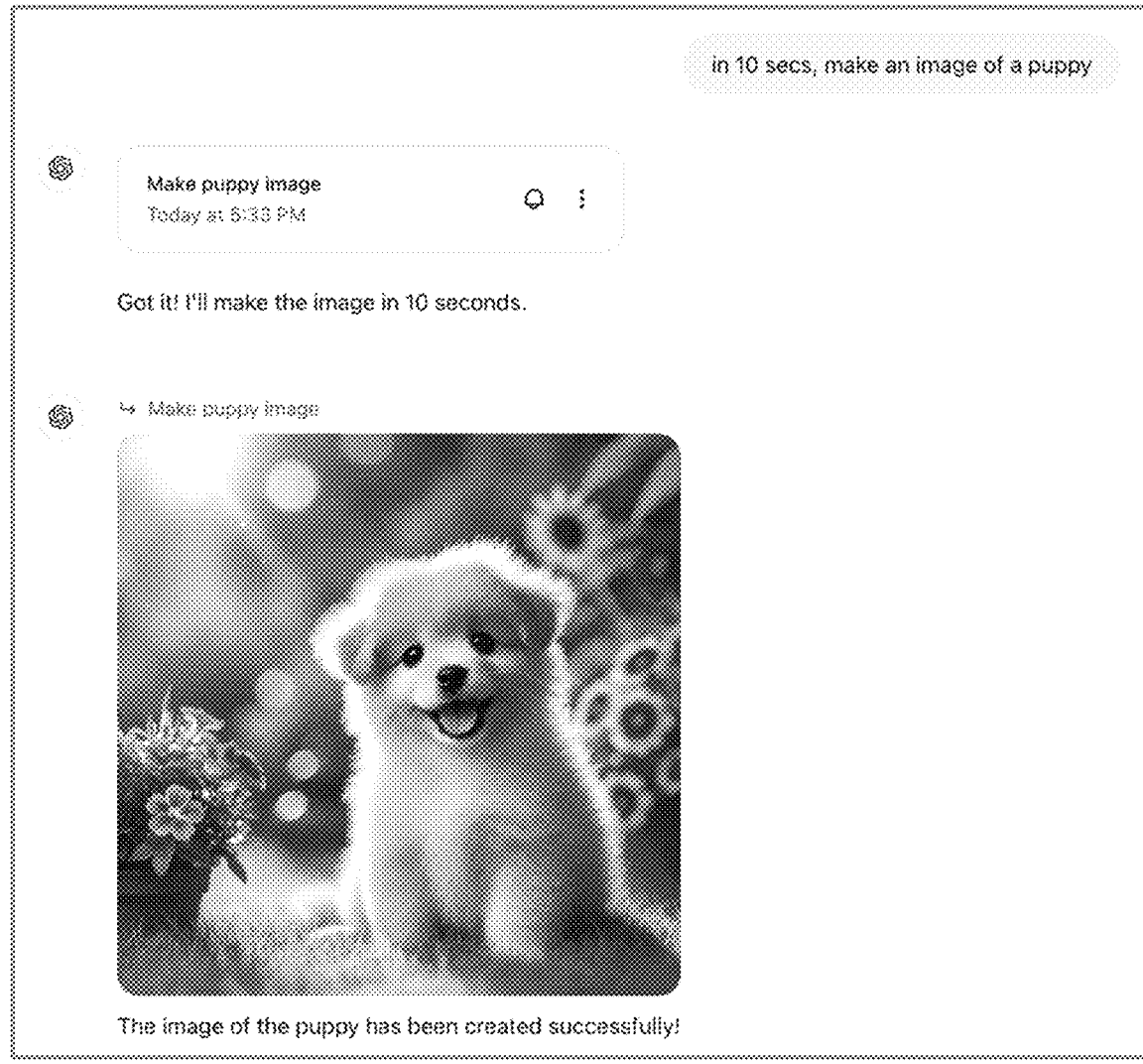
Figure 9C:
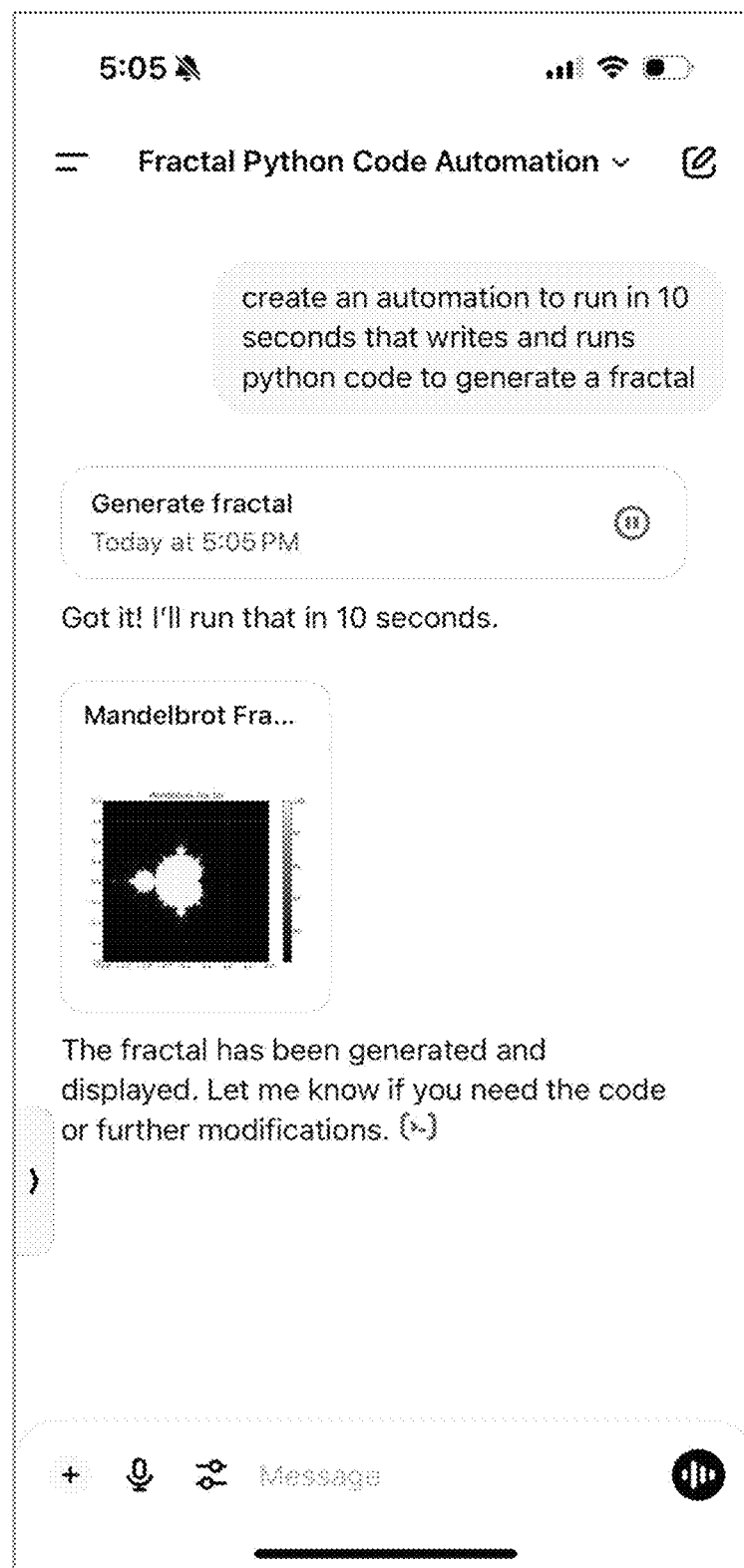

FIGS. 9A-9C provide various examples of automation successes when the system has been properly trained. FIG. 9A shows an example of the trained system properly providing a morning briefing. This example demonstrates the system's ability to execute a recurring task successfully. The user requests a daily morning briefing, and the system accurately provides a concise and relevant update each day. This success highlights the system's potential for effective task automation when the instructions are clear and align with its capabilities.

FIG. 9B shows an example of the trained system generating a requested image at a specified time. In this example, the system effectively performs a creative task, generating daily outputs using DALL-E. The successful execution of this recurring task emphasizes the system's capability to handle specific, well-defined instructions involving creative processes.

FIG. 9C shows an example of the trained system performing a multi-step action and anticipating how the user might want to interact with the results of the action (e.g., the system says "Let me know if you need the code or further modifications"). This example highlights the system's proficiency in executing complex tasks, such as generating fractals. The model correctly interprets and executes the user's request, showcasing its ability to handle intricate and computationally demanding instructions with precision.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, For example, instructions and data which cause or otherwise configure a general purpose computer, special purpose computer, or special purpose processing device to perform a certain function or group of functions. Portions of computer resources used can be accessible over a network. The executable computer instructions may be, For example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspects:

The present technology includes computer-readable storage mediums for storing instructions, and systems for executing any one of the methods embodied in the instructions addressed in the aspects of the present technology presented below:

Aspect 1. A method of scheduling and performing automations, comprising: receiving, at a language model, a prompt in a conversation thread of a user, the prompt including a requested automation that includes a temporal component and an action component; determining, by an automations engine, a delayed action based the action component of the prompt; and translating the temporal component into a scheduling instruction, whereby the delayed action is scheduled.

Aspect 2. The method of aspect 1, further comprising: performing, by the automations engine, the delayed action at a later time in accordance with the scheduling instruction.

Aspect 3. The method of aspect 2, further comprising: determining a delayed prompt based on the action component of the prompt; and sending, as part of the performing the delayed action, the delayed prompt to the language model at the later time encompassed in the delayed action.

Aspect 4. The method of aspect 3, further comprising: sending a notification to the user that the conversation thread has been appended and/or that the delayed action has occurred.

Aspect 5. The method of aspect 3 or 4, further comprising: sending the scheduling instruction to a scheduler; and receiving, in response to the scheduling instruction sent to the scheduler, a message triggering the automations engine to send the delayed prompt to the language model.

Aspect 6. The method of any of aspects 3-5, further comprising: receiving, in response to sending the delayed prompt, a reply from the language model; and appending information of the response and the reply from the language model to the conversation thread of the user.

Aspect 7. The method of aspect 6, wherein the information of the response and the reply are appended to the conversation thread as a new thread branching off from the conversation thread.

Aspect 8. The method of aspect 6, further comprising: determining, in response to receiving the reply to the delayed prompt, whether the action component of the requested automation has been satisfied; generating and sending to the language model one or more additional prompts and receiving one or more additional replies until the action component of the requested automation has been satisfied; and appending information of the one or more additional prompts and the one or more additional replies to the conversation thread.

Aspect 9. The method of any of aspects 3-8, wherein the delayed prompt is an action delegated by the user.

Aspect 10. The method of any of aspects 1-9: further comprising: determining a delayed prompt based on the prompt and additional parts of the conversation thread that provide context for the prompt; sending, as part of the performing the delayed action, the delayed prompt to the language model at the later time encompassed in the delayed action; receiving an additional prompt; and updating the delayed prompt based the delayed prompt, the additional prompt; and the additional parts of the conversation thread that provide the context for the prompt.

Aspect 11. The method of any of aspects 1-9: further comprising: receiving, in response to sending the delayed prompt to the language model, a reply from the language model; and appending information of the reply to the conversation thread, wherein the additional prompt is received from a user account after appending information of the reply to the conversation thread.

Aspect 12. A non-transitory computer-readable storage medium, the computer-readable storage medium including instructions that when executed by a computer, cause the computer to: perform the method of any of aspects 1-11.

Aspect 13. A computing apparatus comprising: a processor; and a memory storing instructions that, when executed by the processor, configure the computing apparatus to: perform the method of any of aspects 1-11.

Aspect 14. A method of acting as a delegate a user for delayed actions, the method comprising: receiving, at a language model, a prompt from the user requesting a delayed action in which an automations engine acts as the delegate of the user; and storing an indicator that the automations engine is authorized to act as the delegate of the user.

Aspect 15. The method of aspect 14, further comprising steps of one or more methods of aspects 1-11.

Aspect 16. The method of aspect 14 or aspect 15, further comprising: converting a live-session access token to a persistent access token; and providing, by the automations engine, the persistent access token when performing the delayed action.

Aspect 17. The method of aspect 16, further comprising: generating a delayed prompt based on the prompt, wherein the delayed action includes sending the delayed prompt to the language model; storing the delayed prompt in association with the persistent access token; and performing the delayed action by: using the persistent access token to authenticate a delayed session between the language model and the automations engine, wherein the automations engine is authenticated as the delegate of the user, sending, in the delayed session, the delayed prompt to the language model, and receiving, in response to sending the delayed prompt, a reply from the language model.

Aspect 18. The method of aspect 17, wherein: the automations engine is the language model with a modification to generate text as coming from the user, thereby providing a modified language, and sending the delayed prompt and receiving the reply from the language model are part of a recursive loop in which the language model interacts via the modification with the language model until a conversation generated via the recursive loop completes the delayed action requested in the prompt.

Aspect 19. The method of any of aspects 14-18, further comprising: analyzing whether prerequisites must be satisfied for the automations engine to perform the delayed action; determining whether one of the prerequisites depends on an action by the user that has not been performed; requesting that the user perform the action; and scheduling the delayed action after the action has been performed.

Aspect 20. The method of any of aspects 14-29, further comprising: generating a delayed prompt based on the prompt, wherein the prompt is part of a conversation thread between the user and the language model; performing the delayed action by sending the delayed prompt to the language model; receiving, in response to sending the delayed prompt, a reply from the language model; and appending the delayed prompt and the reply to the conversation thread.

Aspect 21. The method of aspect 20, wherein: the delayed prompt is expressed as coming from the user, and the appending the delayed prompt includes indicating that the delayed prompt is from the automations engine acting as the delegate of the user.

Aspect 22. The method of aspect 21, wherein: the automations engine includes the language model with a modification to express the delayed prompt as coming from the user.

Aspect 23. The method of any of aspects 14-22, further comprising: generating a delayed prompt based on the prompt and based on additional parts of conversation thread that includes the prompt, wherein the delayed action includes sending the delayed prompt to the language model; and updating the delayed prompt when the delayed action includes multiple instances of sending the delayed prompt to the language model, wherein the delayed prompt is updated based in part on a portion of the conversation thread between a current instance and a previous instance of sending the delayed prompt to the language model.

Aspect 24. A non-transitory computer-readable storage medium, the computer-readable storage medium including instructions that when executed by a computer, cause the computer to: perform steps of one or more of the methods of aspects 14-23.

Aspect 25. A computing apparatus comprising: a processor; and a memory storing instructions that, when executed by the processor, configure the apparatus to: perform steps of one or more of the methods of aspects 14-23.

Aspect 26. A method comprising: receiving, at a language model, a prompt in a conversation thread of a user, the prompt including a temporal component indicating when an event occurs; determining, by the language model, that the prompt includes the temporal component; and determining when the event will occur based on the temporal component, Aspect 27. The method of aspect 26, wherein the method further comprises steps of one or more methods of aspects 1-8 and 14-23.

Aspect 28. The method of aspect 26 or aspect 27, further comprising: determining when the event occurs based on mapping the temporal component to a time at which the user requested a delayed action, the event comprising the delayed action; determining the delayed action based on an action component of the prompt; and sending scheduling instructions to a scheduler, the scheduling instructions causing the scheduler to notify the scheduler to notify an automations engine when the time occurs.

Aspect 29. The method of aspect 28, further comprising: determining a first temporal sensitivity of the delayed action, wherein the prompt comprises a first automation request; ranking the first temporal sensitivity relative to a second temporal sensitivity of second automation request, wherein the first automation request and the second automation request are scheduled to be performed within a same time window; predicting whether a generative response system has sufficient computational resources to perform the first automation request and the second automation request at the same time; and preprocessing the delayed action of the first automation request before the same time when the first temporal sensitivity is less than the second temporal sensitivity, wherein preprocessing the delayed action includes determining a delayed based on the delayed action, sending the delayed prompt to a language model and receiving from the language model a response to the delayed prompt.

Aspect 30. The method of aspect 29, further comprising: preprocessing the delayed action of the second automation request before the same time when the first temporal sensitivity is greater than the second temporal sensitivity Aspect 31. The method of aspect 26 or aspect 27, wherein: the prompt includes an automation request indicating a delayed action, which is the event that occurs at a time that is subsequent to the prompt, and the method further comprises: determining that the language model failed to determine when the event occurs; and suggesting, to the user, an alternative automation request for which the time of the delayed action can be determined.

Aspect 32. The method of aspect 31, wherein suggesting the alternative automation request includes: suggesting an alternative event on which the alternative automation request is conditioned, wherein the alternative event is receiving notification from a third party, or suggesting that the alternative automation request be a reminder to the user reminding the user to check whether the event on which the automation request is conditioned has occurred.

Aspect 33. The method of any of aspects 26-32, further comprising: determining whether the temporal component describes a time at which the event occurs based on a relation of the time to another time; and determining the another time, when the time is relative to the another time, and using the another time to determine the time at which the event occurs.

Aspect 34. The method of aspect 33, wherein, when the another time is now, using a current time to determine the time at which the event occurs.

Aspect 35. The method of any of aspects 26-34, further comprising: determining whether the temporal component describes a time at which the event occurs based on a relation of the time to another time; and sending a scheduling instruction to a scheduler to notify the language model that the event occurred, wherein the scheduling instruction describes the time as relative to the another time.

Aspect 36. The method any of aspects 26-35, determining when the event occurs further comprises: mapping the temporal component a time at which the event occurs based on a description of the time in the prompt, wherein the time at which the event occurs includes a time of day and a calendar date at which the event occurs.

Aspect 37. The method of aspect 36, wherein mapping the temporal component to the time includes: using one or more additional parts of the conversation thread, in addition to the prompt, to resolve an ambiguity of the description of the time in the prompt.

Aspect 38. The method of aspect 36, wherein mapping the temporal component to the time includes: determining that the language model is incapable of determining the time, and sending a request to the user for additional information about the time at which the event occurs.

Aspect 39. The method of aspect 36, wherein mapping the temporal component to the time includes: determining that the language model is incapable of determining the time, and suggesting a modified requested automation, when the time indicated by the temporal component depends on a conditional event that cannot be scheduled.

Aspect 40. The method of any of aspects 26-39, wherein, when the temporal component describes the event as being a future event that occurs at a time that depends on an occurrence of another future event, the determining when the event occurs includes: periodically inquiring whether the another future event has occurred, and, when the another future event has occurred, determining the time based on the occurrence of other future event; sending a request that an entity that is monitoring the occurrence of the another future event notify the language model upon an occurrence of the another future event, or scheduling a reminder to the user to tell the language model whether the another future event occurred.

Aspect 41. The method of aspect 39, further comprising: determining the time based on the occurrence of the another future event.

Aspect 42. A non-transitory computer-readable storage medium, the computer-readable storage medium including instructions that when executed by a computer, cause the computer to: perform steps of one or more of the methods of aspects 26-41.

Aspect 43. A computing apparatus comprising: a processor; and a memory storing instructions that, when executed by the processor, configure the apparatus to: perform steps of one or more of the methods of aspects 26-41.

What is claimed is:

1. A method of scheduling and performing automations, comprising:

receiving, at a language model, a prompt in a conversation thread of a user, the prompt including a requested automation that includes a temporal component and an action component, and the language model being a generative artificial intelligence (AI) model;

determining, by the language model, an automations engine, or a combination thereof, that the prompt includes an automation request requesting a delayed action, the delayed action including a conversational turn in which a delayed prompt is sent, at a time corresponding to the temporal component, from the automations engine to the language model, eliciting the language model to generate a response to the prompt;

determining, by the automations engine, the delayed action based on the action component of the prompt; and translating the temporal component into a scheduling instruction, whereby the delayed action is scheduled.

2. The method of claim 1, further comprising:
sending the scheduling instruction to a scheduler;
receiving, at the automations engine, a first notification from the scheduler that an event corresponding to the scheduling instruction has occurred; and
performing, by the automations engine, the delayed action in response to receiving the notification from the scheduler.

3. The method of claim 2, further comprising:
determining the delayed prompt based on the action component of the prompt; and
sending, as part of the performing the delayed action, the delayed prompt to the language model at the time corresponding to the temporal component.

4. The method of claim 3, wherein the delayed prompt is an action delegated by the user.

5. The method of claim 3, further comprising:
sending a second notification to the user that the conversation thread has been appended and/or that the delayed action has occurred.

6. The method of claim 3, further comprising:
sending the scheduling instruction to the scheduler; and
receiving, after sending the scheduling instruction to the scheduler, a message triggering the automations engine to send the delayed prompt to the language model.

7. The method of claim 3, further comprising:
receiving, in response to sending the delayed prompt, a reply from the language model; and
appending information of the response and the reply from the language model to the conversation thread of the user.

8. The method of claim 7, wherein the information of the response and the reply are appended to the conversation thread as a new thread branching off from the conversation thread.

9. The method of claim 7, further comprising:
determining, in response to receiving the reply to the delayed prompt, whether the action component of the requested automation has been satisfied;
generating and sending to the language model one or more additional prompts and receiving one or more additional replies until the action component of the requested automation has been satisfied; and
appending information of the one or more additional prompts and the one or more additional replies to the conversation thread.

10. The method of claim 1, further comprising:
determining the delayed prompt based on the prompt and additional parts of the conversation thread that provide context for the prompt;

sending, as part of the performing the delayed action, the delayed prompt to the language model at time corresponding to the temporal component;
receiving an additional prompt; and
updating the delayed prompt based the delayed prompt, the additional prompt; and the additional parts of the conversation thread that provide the context for the prompt.

11. The method of claim 10, further comprising:
receiving, in response to sending the delayed prompt to the language model, a reply from the language model; and
appending information of the reply to the conversation thread, wherein
the additional prompt is received from a user account after appending information of the reply to the conversation thread.

12. A non-transitory computer-readable storage medium, the computer-readable storage medium including instructions that when executed by a computer, cause the computer to:
receive, at a language model, a prompt in a conversation thread of a user, the prompt including a requested automation that includes a temporal component and an action component, and the language model being a generative artificial intelligence (AI) model;
determine, by an automations engine, a delayed action based the action component of the prompt, the delayed action including a conversational turn in which a delayed prompt is sent from the automations engine to the language model, eliciting the language model to generate a response to the prompt; and
translate the temporal component into a scheduling instruction, whereby the delayed action is scheduled.

13. The non-transitory computer-readable storage medium of claim 12, wherein the instructions further cause the computer to:
perform, by the automations engine, the delayed action at a later time in accordance with the scheduling instruction;
determine the delayed prompt based on the action component of the prompt;
send, as part of performing the delayed action, the delayed prompt to the language model at the later time encompassed in the delayed action; and
send a notification to the user that the conversation thread has been appended and/or that the delayed action has occurred.

14. The non-transitory computer-readable storage medium of claim 13, wherein the instructions further cause the computer to:
receive, in response to sending the delayed prompt, a reply from the language model; and
append information of the response and the reply from the language model to the conversation thread of the user.

15. The non-transitory computer-readable storage medium of claim 14, wherein the information of the response and the reply are appended to the conversation thread as a new thread branching off from the conversation thread.

16. The non-transitory computer-readable storage medium of claim 14, wherein the instructions further cause the computer to:
determine, in response to receiving the reply to the delayed prompt, whether the action component of the requested automation has been satisfied;

generate and send, to the language model, one or more additional prompts and receiving one or more additional replies until the action component of the requested automation has been satisfied; and append information of the one or more additional prompts and the one or more additional replies to the conversation thread.

17. A computing apparatus comprising:

a processor; and a memory storing instructions that, when executed by the processor, configure the computing apparatus to:

receive, at a language model, a prompt in a conversation thread of a user, the prompt including a requested automation that includes a temporal component and an action component, and the language model being a generative artificial intelligence (AI) model;

determine, by an automations engine, a delayed action based the action component of the prompt, the delayed action including a conversational turn in which a delayed prompt is sent from the automations engine to the language model, eliciting the language model to generate a response to the prompt; and translate the temporal component into a scheduling instruction, whereby the delayed action is scheduled.

18. The computing apparatus of claim 17, wherein the instructions further configure the computing apparatus to:

determine the delayed prompt based on the action component of the prompt;

perform, by the automations engine, the delayed action at a later time in accordance with the scheduling instruction; and send, as part of performing the delayed action, the delayed prompt to the language model at the later time encompassed in the delayed action.

19. The computing apparatus of claim 18, wherein the instructions further configure the computing apparatus to:

send a notification to the user that the conversation thread has been appended and/or that the delayed action has occurred;

send the scheduling instruction to a scheduler, and receive, in response to the scheduling instruction sent to the scheduler, a message triggering the automations engine to send the delayed prompt to the language model; or receive, in response to sending the delayed prompt, a reply from the language model, and append information of the response and the reply from the language model to the conversation thread of the user.

20. The computing apparatus of claim 19, wherein the instructions further configure the computing apparatus to:

determine, in response to receiving the reply to the delayed prompt, whether the action component of the requested automation has been satisfied;

generate and send, to the language model, one or more additional prompts and receiving one or more additional replies until the action component of the requested automation has been satisfied; and append information of the one or more additional prompts and the one or more additional replies to the conversation thread.

* * * * *